(12) United States Patent
Vrotsos et al.

(10) Patent No.: US 7,240,836 B2
(45) Date of Patent: Jul. 10, 2007

(54) ENHANCED SYSTEM AND METHOD FOR WIRELESS TRANSACTIONS

(75) Inventors: Demetrios G. Vrotsos, Titusville, FL (US); Georges F. Elias, Los Angeles, CA (US)

(73) Assignee: Virtual Fonlink, Inc., Los Angeles, CA (US)

( * ) Notice: Subject to any disclaimer, the term of this patent is extended or adjusted under 35 U.S.C. 154(b) by 102 days.

(21) Appl. No.: 10/831,276

(22) Filed: Apr. 23, 2004

(65) Prior Publication Data

US 2005/0236480 A1    Oct. 27, 2005

(51) Int. Cl.
| | |
|---|---|
| *G06K 7/00* | (2006.01) |
| *G06K 5/00* | (2006.01) |
| *G06K 7/08* | (2006.01) |
| *G06K 7/10* | (2006.01) |
| *H04B 1/08* | (2006.01) |
| *H04B 1/38* | (2006.01) |
| *H04M 1/00* | (2006.01) |

(52) U.S. Cl. .................. 235/439; 235/380; 235/449; 235/472.02; 455/349; 455/557; 455/558

(58) Field of Classification Search .......... 235/472.02, 235/439, 440, 451; 455/348, 349, 407
See application file for complete search history.

(56) References Cited

U.S. PATENT DOCUMENTS

| 5,541,985 A * | 7/1996 | Ishii et al. ................ 235/380 |
| 5,729,591 A | 3/1998 | Bailey ........................ 379/59 |
| 5,805,676 A | 9/1998 | Martino |
| 5,850,599 A | 12/1998 | Seiderman |
| 6,032,859 A | 3/2000 | Muehlberger et al. |
| 6,094,640 A | 7/2000 | Goheen |
| 6,234,389 B1 | 5/2001 | Valliani et al. |
| 6,253,998 B1 | 7/2001 | Ziarno |

(Continued)

FOREIGN PATENT DOCUMENTS

EP    0 940 783 A    9/1999

(Continued)

OTHER PUBLICATIONS

European Patent Office Search Report Dated Nov. 30, 2005.

(Continued)

*Primary Examiner*—Jared J. Fureman
(74) *Attorney, Agent, or Firm*—Pillsbury Winthrop Sh Pittman LLP

(57) ABSTRACT

An attachment that may be coupled to a wireless communication device, such as a cellular telephone, personal digital assistant (PDA), or the like, to perform commercial or other information transactions, as well as to an apparatus or system for conducting such transactions. The wireless communication device generally includes an antenna that may be directly accessed by a processor in the attachment for transmission of data to a remote computer over a communication network. The attachment may also include an input device, such as a magnetic stripe reader, smartcard reader, barcode scanner, optical scanner, fingerprint scanner, proximity detector, or the like. When input is received at the input device, the input information may be sent to the attachment processor for processing and transmission to the remote computer via the antenna. The remote computer may process the received attachment-processed data and generate a response to send to the device processor.

27 Claims, 16 Drawing Sheets

U.S. PATENT DOCUMENTS

| | | |
|---|---|---|
| 6,260,026 B1 | 7/2001 | Tomida et al. |
| 6,796,500 B1* | 9/2004 | Chen .......................... 235/439 |
| 6,944,782 B2* | 9/2005 | von Mueller et al. ....... 235/380 |
| 2002/0025796 A1 | 2/2002 | Taylor et al. ................ 455/406 |
| 2002/0037745 A1 | 3/2002 | Yahiro ........................ 455/557 |
| 2002/0046185 A1* | 4/2002 | Villart et al. ................. 705/64 |
| 2002/0170964 A1* | 11/2002 | Sabella ....................... 235/449 |
| 2002/0187807 A1* | 12/2002 | Torre et al. ................. 455/558 |
| 2003/0073415 A1 | 4/2003 | Engstrom et al. ............. 455/90 |
| 2003/0211863 A1 | 11/2003 | Neifer ..................... 455/556.1 |
| 2004/0058705 A1 | 3/2004 | Morgan et al. .......... 455/556.1 |
| 2004/0104268 A1* | 6/2004 | Bailey ........................ 235/439 |
| 2004/0127256 A1* | 7/2004 | Goldthwaite et al. ....... 455/558 |
| 2004/0171406 A1* | 9/2004 | Purk .......................... 455/558 |
| 2004/0230489 A1* | 11/2004 | Goldthwaite et al. ......... 705/26 |
| 2005/0138390 A1* | 6/2005 | Adams et al. .............. 713/185 |
| 2005/0269402 A1* | 12/2005 | Spitzer et al. .............. 235/380 |
| 2006/0006230 A1* | 1/2006 | Bear et al. .................. 235/441 |

FOREIGN PATENT DOCUMENTS

| | | |
|---|---|---|
| WO | 9848522 | 10/1998 |
| WO | WO 01/61973 | 8/2001 |

OTHER PUBLICATIONS

Menezes, Vanstone, Oorschot: Handbook of Applied Cryptography, 1997, CRC Press LLC, USA, XP002338714, pp. 12-13, no month.

* cited by examiner

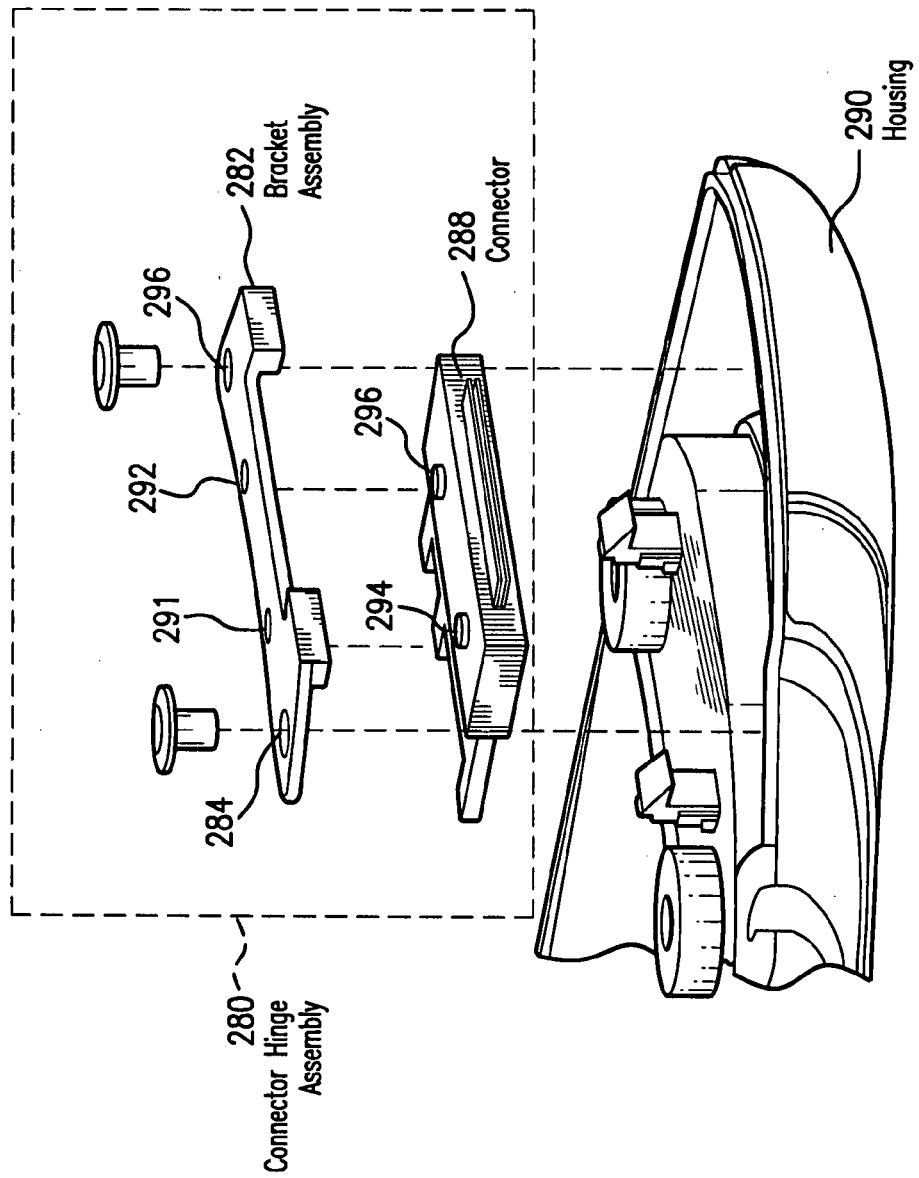

ENHANCED SYSTEM AND METHOD FOR WIRELESS TRANSACTIONS

BACKGROUND

For many merchants, particularly those that conduct business while travelling or at a large facility where distributed customer service is advantageous, it is desirable to conduct point-of-sale commercial transactions. Likewise, for others, such as law enforcement officials, it may be necessary or helpful to be able to transmit information, e.g., a suspect's fingerprint or driver's license information, from a portable field device.

Previous systems designed to transmit input information to a remote location for processing a commercial transaction have largely involved non-mobile systems. For example, retail stores commonly have credit card reading terminals that a cashier can use to swipe a credit card. Information encoded in a magnetic stripe on the credit card is received by the reader and transmitted to a remote credit card processing computer over the public switched telephone network (PSTN). However, these terminals are fixed to a particular location by the need for access to PSTN connections. Accordingly, they are impractical for use in commercial transactions that take place in the field.

Attempts to incorporate the functionality of credit card readers and other input devices into wireless telephones could be improved. For example, U.S. Pat. No. 5,729,591 to Bailey and assigned to Virtual Fonlink, Inc. describes a cellular telephone with an integrated magnetic stripe reader. Because in most cases, the functionality provided by the additional input devices is not used as frequently as the standard voice communication functionality of the telephone, the processing power and software required to interface with the additional input devices is not utilized during most telephone operations. Accordingly, using integrated telephones for this purpose is inordinately expensive. It is also unnecessarily unwieldy for the user to utilize the telephone for its originally intended non-transactional purpose (i.e., placing or receiving a telephone call). Moreover, if the user wishes to upgrade the telephone handset, the input devices and associated components must be discarded.

Similar to the integrated system described in the Bailey patent, U.S. Pat. No. 5,850,599 to Seiderman, describes a cellular telephone in which a magnetic stripe reader is interposed between the handset and the transceiver. By placing the reader in this intermediate position, the user is forced to swipe a credit card in order to use the handset. This system also does not involve a modular attachment. Accordingly, a user is not able to use the handset without the reader and is required to replace the reader in order to upgrade the handset.

Previous systems that have incorporated input devices such as magnetic stripe readers and barcode scanners into modular attachment devices have not overcome these cost and functionality disadvantages. U.S. Pat. No. 6,234,389 to Valliani et al. describes an module that may interface with a laptop computer or personal digital assistant (PDA) through a PCMCIA interface. The module may include a magnetic stripe reader for reading standard credit cards, a smartcard reader, a PIN pad unit, a printer, a fingerprint reader and a signature capture unit. However, in both instances, data must be transferred to a processor within the main device (as opposed to the attachment) before being transmitted, either over the wireless network or the PSTN, to the remote computer. Therefore, in the system disclosed in the Valliani et al. patent, the telephone, laptop computer or PDA is still required to satisfy unnecessarily high hardware and software requirements, just as with the integrated systems.

Similarly, an attachment sold under the product name TransAKT is available from Wildcard Wireless Solutions, Inc. of Vancouver, British Columbia, Canada. The pertinent details of the operation of the TransAKT device are described in PCT Application No. PCT/CA98/00357 (International Publication No. WO 98/48522). The attachment may be coupled to the back surface of a cellular telephone and includes a PIN pad unit and two separate magnetic stripe and smartcard readers. During a transaction, the attachment reads information from a credit card, debit card or smart card using one of the two readers, encrypts the information and transmits the encrypted information to a credit card or other validation site using the voice connection previously established by the telephone. However, the attachment is still required to interface with the cellular telephone or other device through the processor of the other device. Additionally, in at least some embodiments, the attachment requires a separate antenna and/or transceiver. Both of these requirements add expense and reduce modularity of the TransAKT system.

Moreover, in both the integrated systems and the attachment systems, passing the data read in from an input device through the processor of the wireless device raises security issues. For example, in a credit card transaction, an unscrupulous merchant may be able to save a customer's credit card information to the memory in a wireless telephone, PDA or laptop computer in order to conduct future fraudulent transactions.

Accordingly, a need exists for an attachment which incorporates or integrates a processor. To maintain security, a need exists for the attachment to have encryption capabilities, and the encryption capabilities may be resident in the processor. It is also advantageous for the attachment to be able to communicate to other devices via a communications interface that does not require the utilization of communication components located in the wireless communication device.

BRIEF DESCRIPTION OF THE DRAWINGS

FIG. 4(c) illustrates a connector hinge assembly accordingly to an embodiment of the present invention;

DETAILED DESCRIPTION

The present invention is directed to a system and method for transmitting transaction data identification data, measurement data, or other secure personal data over a wireless communication network. Embodiments of the system may be used to transmit credit card information during a point-of-sale transaction, transmit fingerprint information during a traffic stop, transmit bar code information during a tour of a warehousing facility or retail location, or the like. According to embodiments of the invention, an attachment is coupled to a wireless communication device having a transceiver for establishing a communication link with a wireless communication network. The attachment may include a processor and one or more input devices. When the attachment receives data via one of the input devices, it may transmit the data over the wireless communication network using the transceiver in the wireless communication device. In an embodiment of the invention, the attachment may receive data via one of its input devices and may transmit data over the wireless communication network via a transceiver or communication interface located in the attachment. The attachment may also be referred to as a peripheral or peripheral device.

Figure 1B:
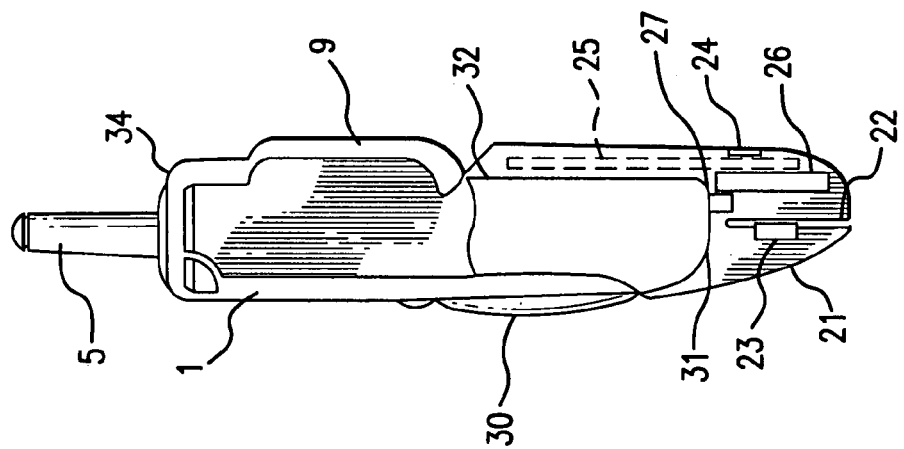
FIGS. 1A and 1B show front and side views of an attachment coupled to a wireless telephone according to an embodiment of the present invention.
Figure 1A:
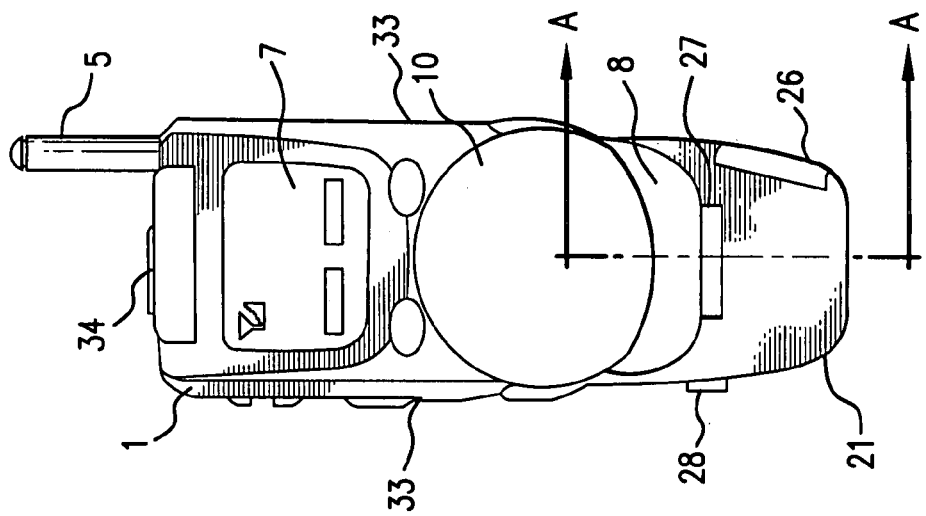
Figure 1D:
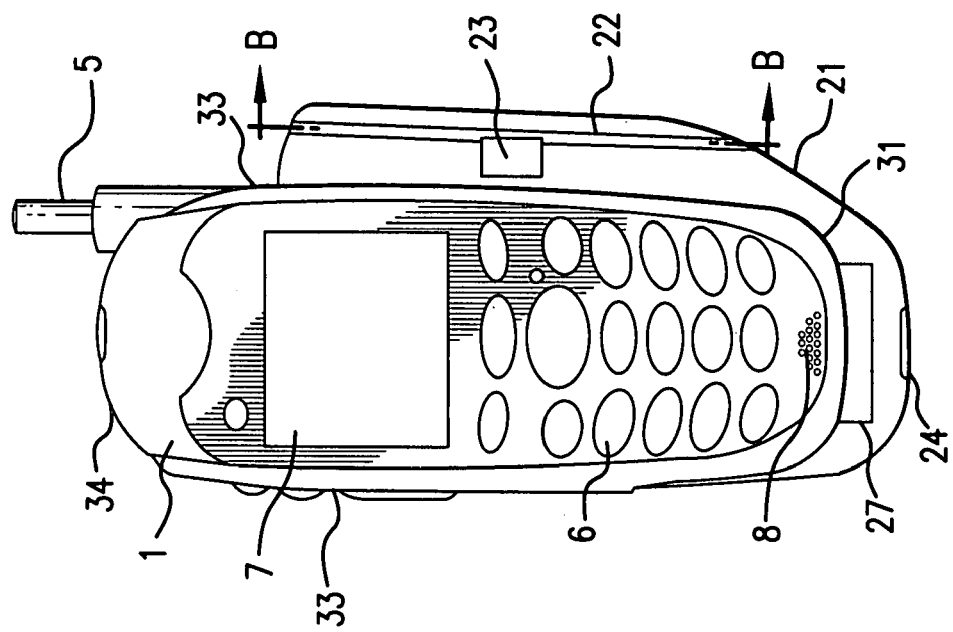
FIGS. 1C and 1D show front and side views of an attachment coupled to a wireless telephone according to an alternative embodiment of the invention.
Figure 1C:
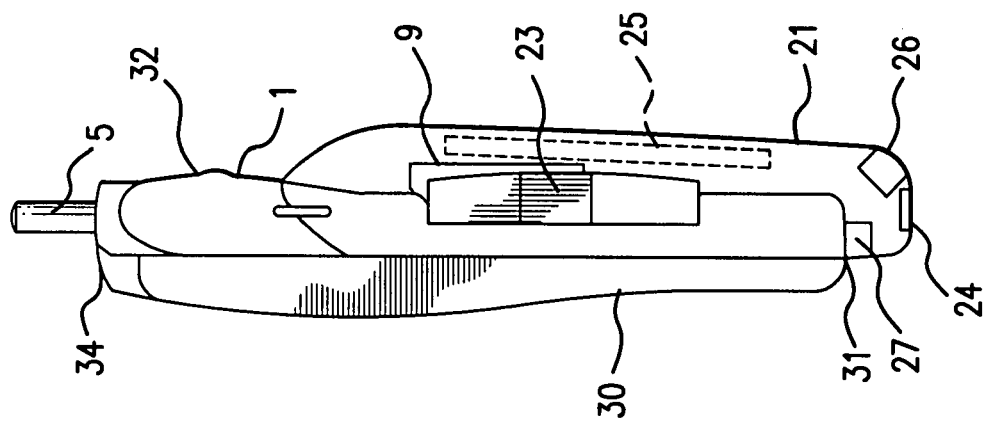

FIGS. 1A and 1B show a wireless communication device 1 and attachment 21 according to an embodiment of the invention. FIG. 1A shows a front view of the wireless communication device 1 and the attachment 21, while FIG. 1B shows a side view of the wireless communication device 1 and a cross-sectional side view of the attachment 21 taken along line A—A in FIG. 1A. Similarly, FIGS. 1C and 1D show a wireless communication device 1 and attachment 21 according to an alternative embodiment of the invention. FIG. 1C shows a side view of the wireless communication device 1 and a cross-sectional side view of the attachment 21 taken along line B—B shown in FIG. 1D. The wireless communication device 1 may be a telephone, PDA, pager, computer or other device capable of sending and receiving signals over a wireless communication network (102 in FIG. 6). Wireless communication networks may include PCS, cellular or satellite telephone networks, may transmit messages radio, infrared or other electromagnetic waves, and may utilize one or more communication protocols including Code Division Multiple Access (CDMA), Time Division Multiple Access (TDMA, including Global System for Mobile communications (GSM), Interim Standard 54 (IS-54), Interim Standard 136 (IS-136), and Cellular Digital Packet Data (CDPD)), Frequency Division Multiple Access (FDMA), WCDMA, CDMA2000, Advanced Mobile Phone System (AMPS), Narrowband Advanced Mobile Phone System (NAMPS) and the like. The wireless communication device may include an antenna 5, one or more processors (such as, a central processing unit (CPU), and/or a digital signal processor (DSP)), an outer casing 10, a power source (e.g., a rechargeable battery 9 or a power adapter cable and/or connector for coupling to an AC or DC fixed power source, such as an automobile cigarette lighter or a wall outlet), one or more output devices, and one or more input devices. For example, in embodiments in which the wireless communication device is a wireless telephone, speaker (not shown in FIGS. 1A and 1B because it is concealed within the "clamshell"-style outer casing 10, but shown in FIGS. 1C and 1D as 6) and liquid crystal display (LCD) 7 for communicating audio and graphical information, respectively, to a user may constitute "output devices" and microphone 8 and alphanumeric keypad (not shown in FIGS. 1A and 1B because it is concealed within a "clamshell"-style outer casing 10, but shown by reference numeral 6 in FIGS. 1C and 1D) may constitute "input devices." The wireless communication device 1 may also have a power button or other mechanism for activating the wireless communication device 1 to draw power from the battery 9, power cable or other power source.

The attachment 21 may include one or more input devices, such as a magnetic stripe reader, a smartcard reader, a fingerprint scanner, an optical scanner, a signature pad, an alphanumeric keypad (such as, a PIN pad), a proximity detector, an audio recording device, or a camera (such as, a digital or charge-coupled device (CCD) camera). In the embodiment of the attachment shown in FIG. 1, the attachment includes a magnetic stripe reader that can be used to collect information encoded in the magnetic stripe on a credit card, driver's license, or the like. The magnetic stripe reader may include a slot 22 through which the magnetic stripe-carrying card may be passed before a reader head 23 to decode the data encoded therein. The depth of the slot 22 may be chosen to correspond to the location at which magnetic stripes are commonly embedded in cards, such that placement of a card in the slot positions the magnetic stripe to be read by the reader head 23. The reader head 23 may form a portion of a side wall of the slot 22, such that the magnetic stripe of a swiped card can be read by said reader head 23.

Figure 2:
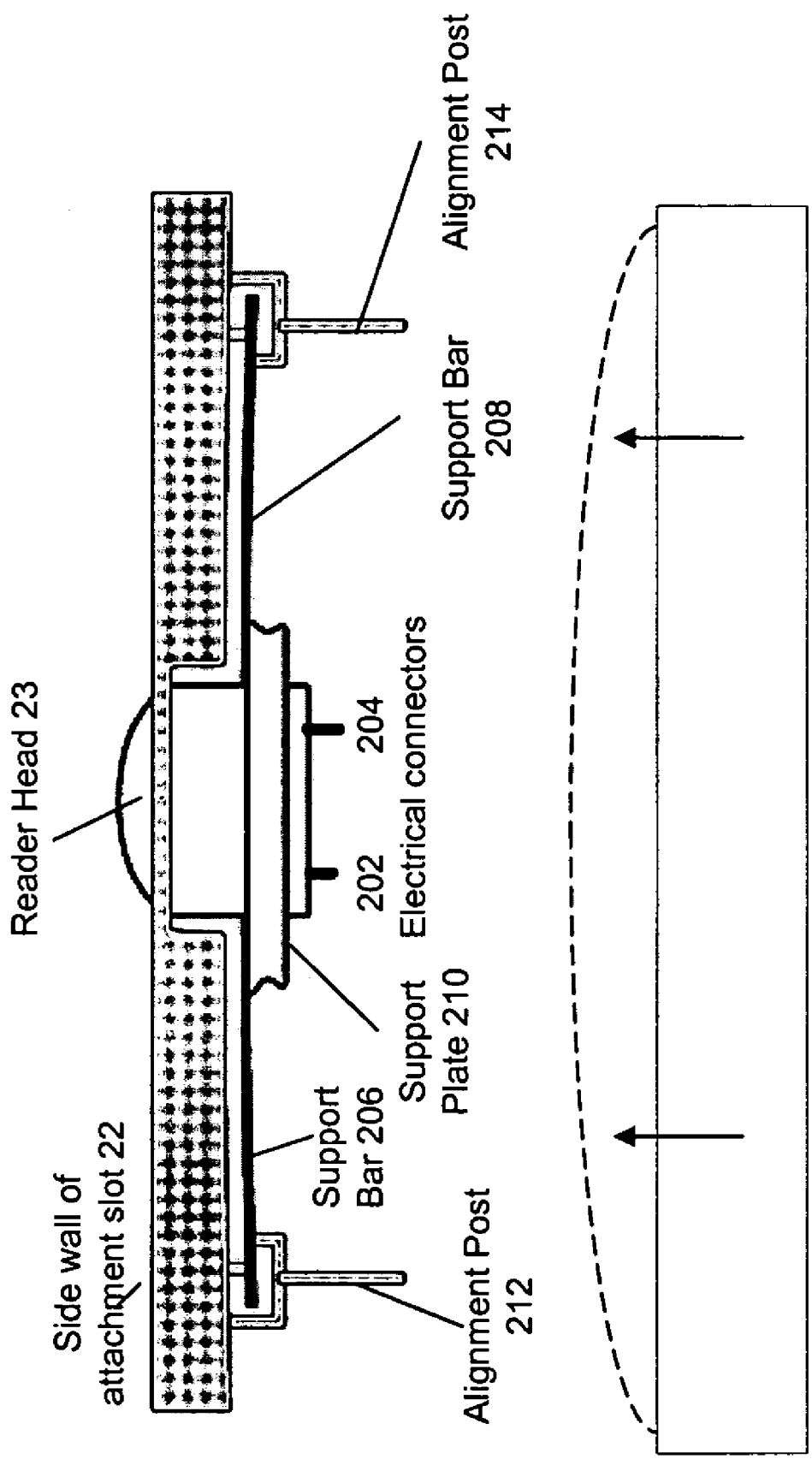
FIG. 2 illustrates a side cross-sectional view of a reader assembly according to an embodiment of the present invention.

FIG. 2 illustrates a side cross-sectional view of a reader assembly including a reader head and a support structure according to an embodiment of the present invention. Because the attachment 21 and the wireless communication device 1 are being utilized in a mobile environment, stresses or forces may be exhibited on the attachment 21 and/or the wireless communications device 1 that cause the reader head 23 to read the information less reliably. In other words, the reader head 23 and the card or object being read are not aligned to efficiently read transaction or identification data, for example, to read the magnetic stripe or to capture bar code data. A support structure for the reader head 23 enhances the operation of the reader head 23. Part of the support structure is a reader head assembly 201. The reader head assembly 201 may be one physical device with a number of connected pieces and may include the reader head 23, the electrical connectors 202 and 204, (to connect the reader head 23 to data signals, control signals, and power signals transmitted to or received from the wireless communication device 1), a support plate 210, and in the embodiment illustrated in FIG. 2, a pair of support bars 206 and 208. In an embodiment of the invention, the support structure may also include a pair of alignment posts 212 and 214.

In an embodiment of the present invention, the side wall of the attachment slot 22 has a cutout. This allows a top surface of the reader head 23 to protrude slightly higher than the side wall of the attachment slot 22. In one embodiment of the invention, the reader head 23 rests within a support plate 210. The support plate 210 is fitted to allow a bottom surface of the reader head 23 and the electrical contacts 202 and 204 to protrude from the support plate 210. As part of the reader head assembly 201, the support plate 210 is connected to at least a pair of support bars 206 and 208. The support bars 206 and 208 are connected to the support plate 210 at one end and to a pair of alignment posts 212 and 214 at an opposite end. The alignment posts 212 and 214 are connected to the attachment slot 22 side wall and also to the support bars 206 and 208. In the embodiment of the invention illustrated in FIG. 2, the alignment post 212 is connected to support bar 206 at two locations and to the attachment slot 22 side wall at one other location.

In an embodiment of the invention, the support bars 206 and 208 are made of a flexible metal which allows the support bars to act like springs for the reader head. In other words, a pressure, as illustrated by the arrows in FIG. 2, enables or presses the reader head 23 to protrude from the side wall of the attachment slot 22, even if a card or object is placing downward or opposite pressure against the reader head 23. In an embodiment of the invention, the support bars may be ½ inch wide to provide necessary spring tension for the reader head in the reader head assembly 201.

As shown, the attachment 21 also includes an infrared port 24, through which the device may receive or transmit data transmissions independent of the antenna 5 of the wireless communication device 1. In other embodiments of the invention, the infrared port 24 may be replaced with a communication interface, which may include ports or transceivers, such as those for receiving BLUETOOTH or IEEE 802.11 transmissions, e.g., 802.11(a), 802.11(b), 802.11(g), 802.11(n), 802.11(i), 802.11(d), and 802.16a WiMax). The list of wireless communication protocols is meant to be representative and not to be restrictive. The infrared port 24 may be used as an output device. For example, in embodiments of the invention, a remote computer (shown by the reference numeral 101 in FIG. 2) may transmit information (such as, a receipt for printing or a transaction record) to the attachment 21 for reformatting and retransmission to a peripheral device (such as, a printer, PDA or the like) using the infrared port 24.

Figure 3:
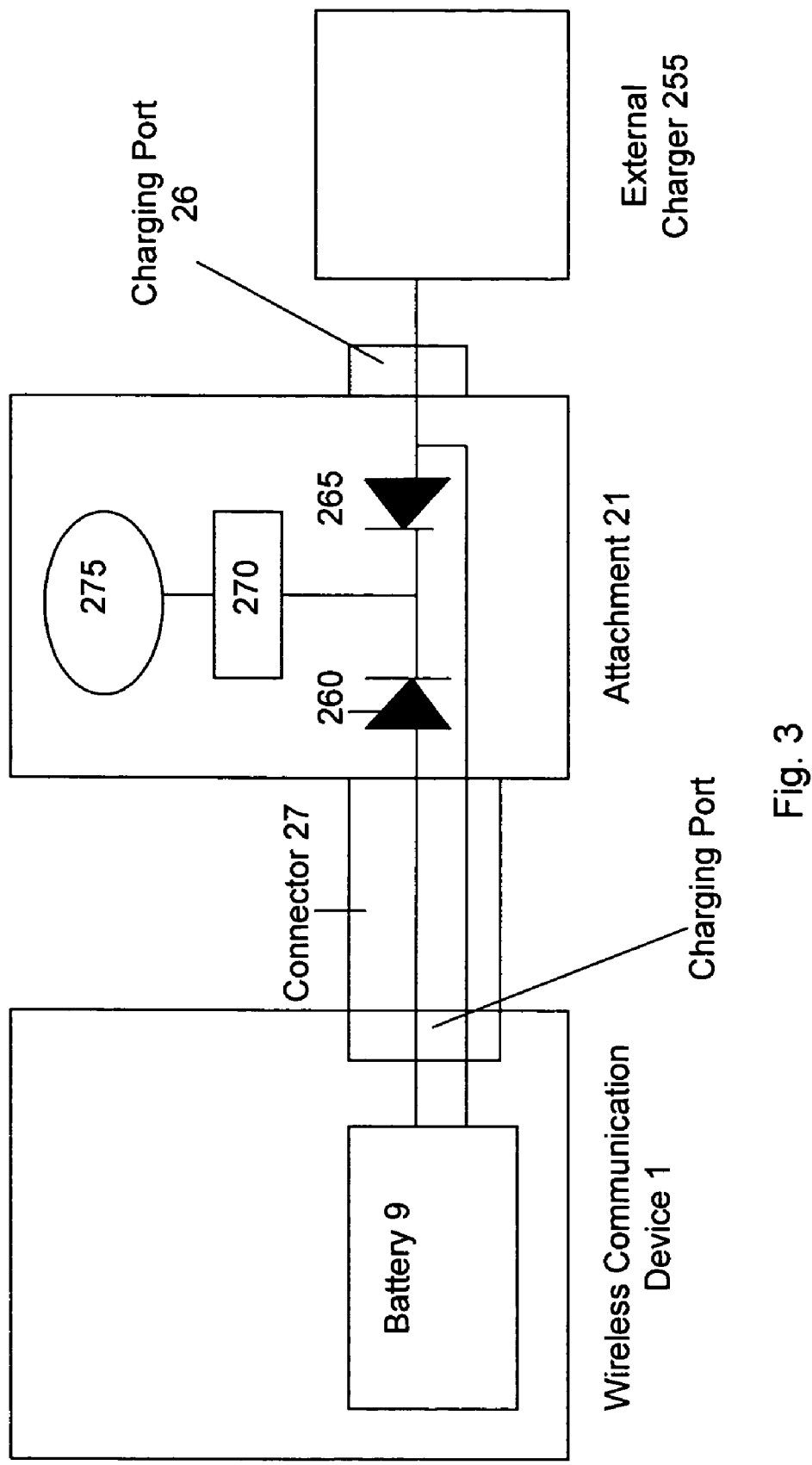
FIG. 3 illustrates a powering system including a wireless communication device and an attachment according to an embodiment of the present invention.

The attachment 21 may also include an independent processor located on printed circuitboard (PCB) 25. FIG. 3 illustrates a power system of the attachment 21 and the wireless communication device 1. The attachment 21 may be powered from the power source (battery 9) of the wireless communication device 1 or may have an independent power source, such as its own rechargeable battery (not shown), or a charging port 26 from which it may be charged by an external power source utilizing an external charger 255. In embodiments of the invention, the charging port 26 of the attachment 21 may be connected to a charging port of the wireless communication device 1 through the connector (not shown). In embodiments of the invention in which the attachment 21 is powered from a rechargeable battery that is separate from a rechargeable battery 9 used to power the wireless communication device 1, both batteries may be recharged from the same charging port 26. The wireless communication device 1 includes a battery source 9. The attachment 21 may include a pair of diodes 260 and 265, a voltage regulator 270, and other attachment components 275. In an embodiment of the invention, the components 275 of the attachment 21 are powered by the battery source 9 located in the wireless communication device 1. A diode 260 is coupled between the battery source 9 and the components 275 of the attachment to protect from overvoltage or overcurrent conditions from the battery source 9. A regulator 270 is coupled between the diode 260 and the components 275 to provide the required voltage to the components 275 within a specified tolerance.

In an embodiment of the invention, an external charger 255 may be directly connected to the attachment 21 through the charging port 26. The power supplied by the external charger 255 is utilized to power the components 275 of the attachment 21. In this embodiment of the invention, a diode 265 is present in the attachment 21 to prevent an excessive current or an excessive voltage from damaging the components 275 of the attachment 21. A regulator 270, coupled between the diode 265 and the components 275, regulates the voltage to the appropriate levels required by the components 275 of the attachment, e.g., 3.3 volts, 5 volts, or 12 volts. The power from the external charger 255 may also be routed to the wireless communication device 1 through a connector 27 and a wireless communication device charging port to charge the battery 9. The battery 9 may be utilized to power the wireless communication device 1. In this embodiment of the invention, the battery source 9 may also provide additional backup power to the attachment 21 if the attachment is also being powered by the external charger 255. The power is transferred from the battery source 9 through the diode 260 through the regulator 270 to the components 275 of the attachment 21.

In the embodiment of the invention shown in FIGS. 1A and 1B, the wireless communication device 1 (shown as a wireless telephone) has an outer casing with a front surface 30, bottom surface 31, a back surface 32, two side surfaces 33 and a top surface 34. The input and output devices of the wireless communication device 1 (e.g., microphone 8, alphanumeric keypad 6, speaker and LCD 7 for the cellular telephone shown) may be provided in the front surface 30. A battery of the wireless communication device 1 may be accessible to the user from the back surface 32. The antenna 5 of the wireless communication device 1 may protrude from the top surface 34. Communication ports (e.g., an RS-232 port) and/or power transfer ports (e.g., for connection to a power cable that can be coupled to an AC or DC power source) may be provided on the bottom surface 31. It will be understood that although these various features are described as being provided on the respective surfaces of the outer casing of the wireless communication device for the illustrated embodiment, the location of a particular feature on a particular surface is generally a matter of design choice. The attachment 21 and the wireless communication device 1 may be detachably coupled by a latching mechanism, such as spring clips, screws, or other fasteners that may be selectively engaged. The attachment 21 may be detached from the wireless communication device 1 by activation of a release mechanism, e.g., pressing a release button 28 to disengage the latching mechanism. In the embodiment shown, the latching mechanism and the release mechanism (release button 28) are shown as contained in the attachment 21. However, it will be readily understood by those of skill in the art that either or both of these features may instead be contained in the wireless communication device. Furthermore, in embodiments of the invention, the latching mechanism and the release mechanism may be part of the connector 27, which is described in greater detail below.

The attachment 21 may have recessed portion with corresponding surfaces that conform to all or parts of one or more of these surfaces such that the recessed portion of the attachment 21 receives the wireless communication device 1 when the two are coupled together. For example, in the embodiment illustrated in FIGS. 1A and 1B, the attachment 21 may have a recessed portion with surfaces conforming to the bottom surface 31 and the back surface 32 of the wireless communication device 1. In such an embodiment, the slot 22 of the attachment 21 may run substantially parallel to the bottom surface 32 of the wireless communication device 1. In an alternative embodiment of the invention such as that shown in FIGS. 1C and 1D, the attachment may have surfaces that conform to the bottom surface 31, a side surface 33 and the back surface 32 of the wireless communication device 1. In such embodiments, the slot 22 may run substantially parallel to the side surface 33 of the wireless communication device. In either case, the slot 22 preferably extends from a first opening in the casing of the attachment 21 to a second opening in the casing of the attachment 21 so that a user may slide the card entirely through the slot 22 in a single swiping motion.

Figure 4B:
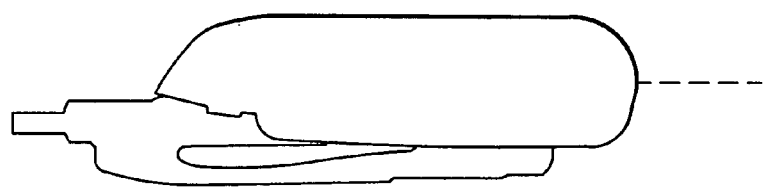
FIG. 4(b) illustrates a final resting position of a wireless communication device within an attachment according to an embodiment of the invention.
Figure 4A:
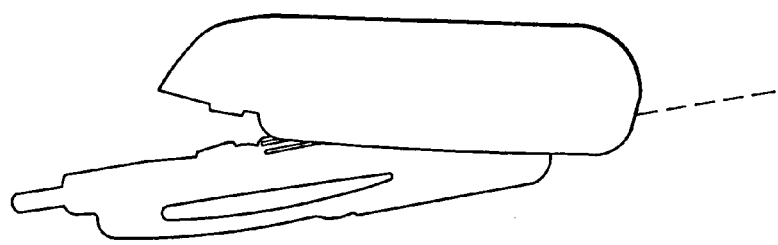
FIG. 4(a) illustrates an initial insertion position for a wireless communication device into an attachment according to an embodiment of the present invention.

FIGS. 4(a) and 4(b) illustrate an attaching of a wireless communication device to an attachment according to an embodiment of the present invention. In attaching the wireless communication device to the attachment, a male version of the connector in the attachment 21 aligns with and connects with a receptacle connector on the wireless communication device 1. The dotted line in FIG. 4(a) illustrates an initial insertion position for the wireless communication device 1 into the attachment 21. FIG. 4(b) illustrates a final resting position of the wireless communication device 1 within the attachment 21. FIG. 4(c) illustrates a connector hinge assembly to enable a wireless communication device to attach to an attachment in embodiments of the present invention. A connector hinge assembly 280 accommodates both the initial insertion position and the final resting position for the wireless communication device and the attachment. The connector hinge assembly 280 allows the front-to-back movement necessary to support an angle of the wireless communication device 1, e.g., a phone, and the attachment 21 during the initial insertion position and to support an approximately 90 degree angle of the wireless communication device 1 and the attachment 21 in the final resting position.

FIG. 4(c) illustrates a connector hinge assembly accordingly to an embodiment of the present invention. The connector hinge assembly 280 allows the phone connector to rotate, in a front to back movement to support the interface angle of the wireless communication device 1 as it engages with the attachment 21. In an embodiment of the invention, a bracket assembly 282 includes two holes 284 and 286. In an embodiment of the invention illustrated in FIG. 4(c), the screws (e.g., torx screws) inserted into the two outer holes 284 and 286 are used to align or position the connector 288 and the housing 290, e.g., the top housing. A tolerance is incorporated in the space between the screws to allow the connector 288 to move. Elongated holes 291 and 292 in the bracket assembly 282 align with the cylindrical posts 294 and 296 located on the connector 288 and are inserted onto the cylindrical posts 294 and 296. The elongated holes 291 and 292 allow or facilitate the front to back or "rocking" motion of the connector hinge assembly 280.

In an embodiment of the invention, a miniature connection board couples the attachment 21 connector to an input portion of an attachment main printed circuit board. The miniature connection board is connected to the leads of the attachment connector. In an embodiment of the present invention, the leads of the attachment connector may be of a fine-pitch. The miniature connection board includes a flexible cable connector. A first end of the flexible cable connector is attached to the attachment connector and a second end of the flexible cable connector is attached to a connector on the attachment main PCB.

Figure 5A:
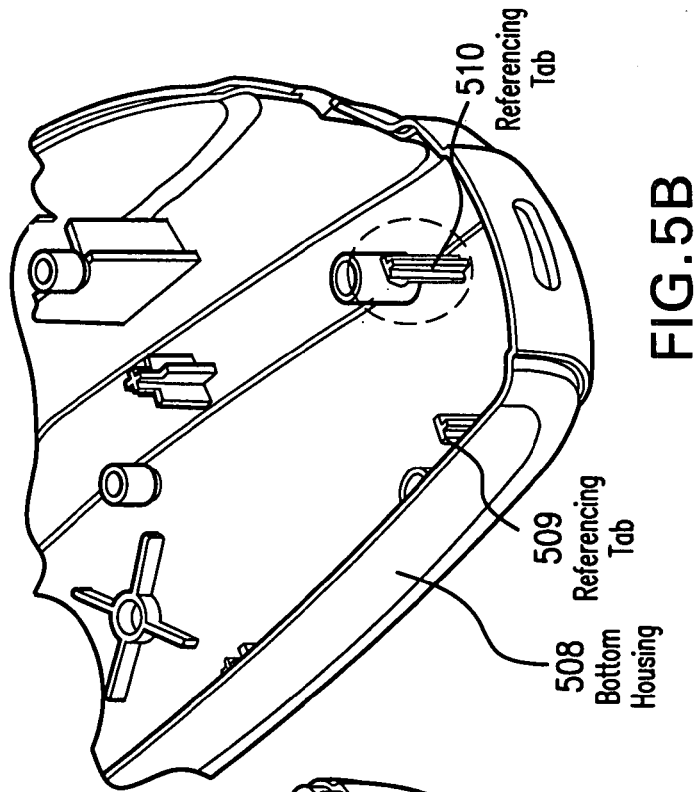
FIG. 5(a) illustrates a top housing including one-way tabs according to an embodiment of the invention.
Figure 5B:
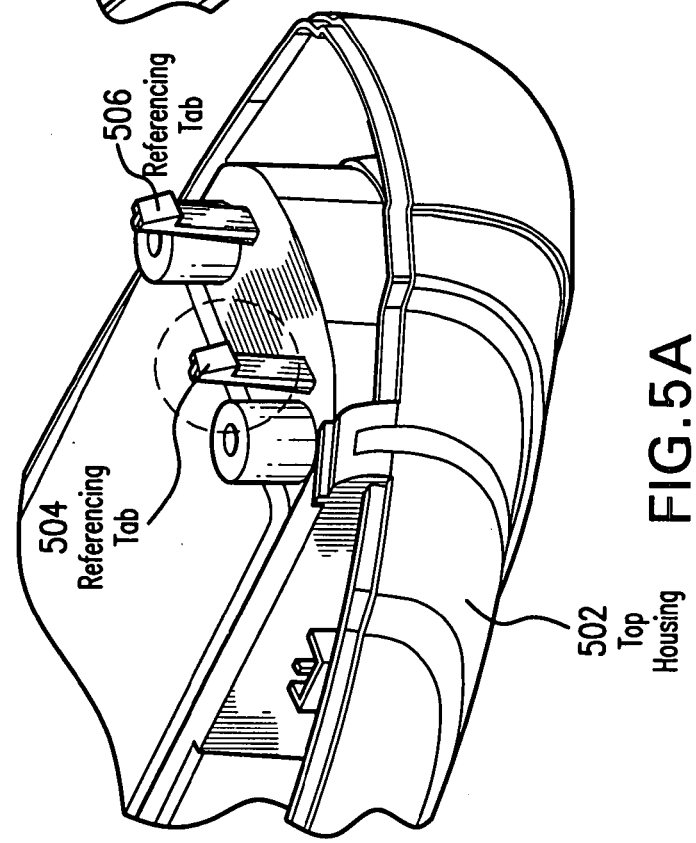
FIG. 5(b) illustrates a bottom housing including one-way tabs according to an embodiment of the invention.

FIG. 5(a) illustrates a top housing including one-way tabs according to an embodiment of the invention and FIG. 5(b) illustrates a bottom housing including one-way tabs according to an embodiment of the invention. The attachment 21 includes a top housing 502 and a bottom housing 508. The top housing 502 and the bottom housing 508 are mechanically connected to each other via a plurality of connectors, e.g. screws. In addition, one-way referencing tabs 504, 506, 509, and 510 are utilized to provide further mechanical connections and stability between the top housing 502 and the bottom housing 508. In an embodiment of the invention, the attachment 21 may include eight one-way referencing tabs or four pairs of one-way referencing tabs. In other words, the top housing 502 includes four one-way referencing tabs and the bottom housing 508 includes four corresponding one-way referencing tabs. In an embodiment of the invention, the one-way referencing tabs may be located in each corner of the top housing 502 and the bottom housing 508. In FIG. 5(a), which illustrates a section of the top housing 502, two referencing tabs 504 and 506 are illustrated in the top housing 502. In FIG. 5(b), the two corresponding one-way referencing tabs 509 and 510 in the bottom housing 508, which correspond to and connect with the one-way referencing tabs 504 and 506, are illustrated.

Figure 1E:
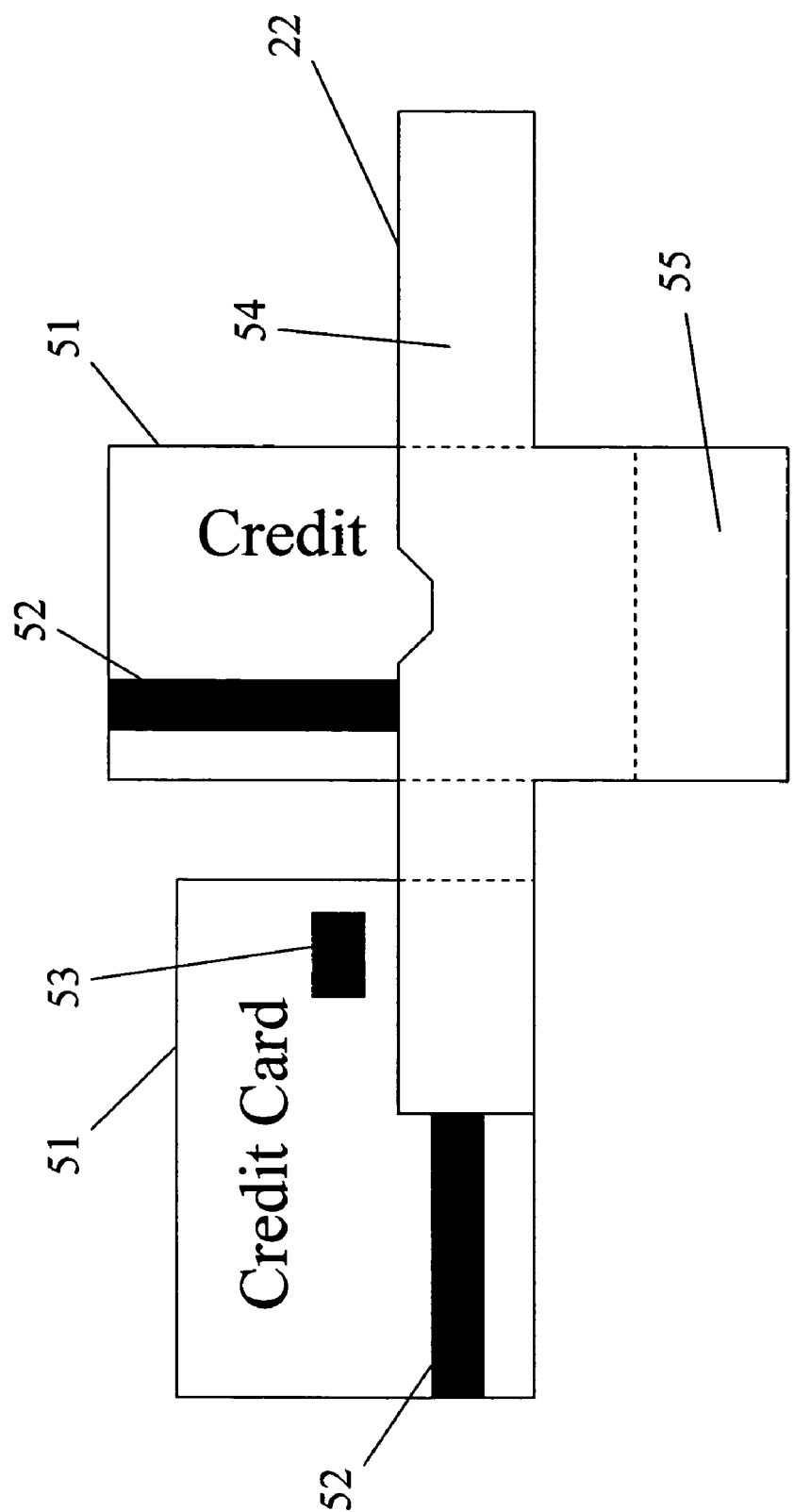
FIG. 1E shows a embodiment of a slot that may be used in an attachment according to an embodiment of the present invention.

In embodiments of the invention, the attachment 21 may have a combined magnetic stripe reader and smartcard reader. In such embodiments, the slot 22 may be as shown in FIG. 1E. A card 51 having a magnetic stripe 52 and/or smartchip 53 may be inserted into the slot 22. The slot may be shaped so as to include a shallow channel portion 54 of a depth suitable for reading a magnetic stripe 52 positioned parallel to a lateral surface of the card 51 as well as a deeper channel portion 55 of a suitable depth and width such that substantially all of the card 51 may be inserted into the slot 22 when a portion of the card 51 is inserted into the deeper channel portion 55. As shown, the deeper channel portion 55 is of a width substantially identical to the width of the card 51, such that lateral surfaces of the deeper channel portion 55 may contact the lateral surfaces of the card 51 to ensure that the smartchip 53 is in a desired location. A magnetic stripe reader head may be located within a surface of the shallow channel portion 54 so that the magnetic stripe 52 can be read as the card 51 is swiped through the shallow channel portion 54. A smartcard read/write head may be positioned within a surface of the deeper channel portion 55 of the slot 22 so that information may be read from or written to the smartchip 53 when the card is positioned within the deeper channel portion 55.

The wireless communication device 1 may have a communication port and the attachment 21 may have a corresponding connector 27 that mate when the two are coupled together, permitting electrical signals to be passed from the attachment 21 to the wireless communication device 1 and vice versa. The surfaces of the recessed portion of the attachment 1 may act as a guide in the process of coupling the attachment 21 to the wireless communication device 1 to ensure that the connector 27 of the attachment and the communication port 309 of the wireless communication device 1 mate properly (i.e., that the connector 27 is not improperly flexed, that pins of the connector are coupled to the correct pins of the corresponding port, etc.).

In embodiments of the invention, the connector 27 of the attachment 1 may include an RS-232 serial interface connector of the type commonly used to interface modems or other peripherals with computers and other electronic equipment. However, in other embodiments of the invention, other types of serial or parallel interface connectors may be used. The communication port of the wireless communication device 1 that mates with this connector 27 may be electrically coupled directly to the antenna 5. The connector 27 may also include a power transmission connector to allow operational power to be transmitted either from the wireless communication device 1 to the attachment 21 (e.g., in embodiments in which the attachment is powered by a battery of the wireless communication device 1) or from the attachment 21 to the wireless communication device 1 (e.g., in embodiments in which the charging port 26 of the attachment 21 is electrically coupled to a charging port of the wireless communication device 1). As previously mentioned, in embodiments of the invention in which the attachment 21 and the wireless communication device 1 have separate rechargeable batteries as power supplies, the charging port 26 may be used to recharge both of these batteries.

The attachment 21 may also include a Global Positioning System (GPS) locator chipset so that the location of the attachment (and thereby, the user) can be tracked from a remote computer. The GPS locator may be placed on the PCB 25. The GPS locator may send location information to a remote computer (101 in FIG. 2) periodically or upon receipt of a query from the remote computer 101. In embodiments of the invention, the location information may be used to identify fraudulent transactions. For example, if the remote computer 101 engages in two commercial transactions with the attachment 21 from geographically distant locations within a time period within which it is unlikely that the user could have traveled from the first location to the second location, the transactions may be flagged as possibly fraudulent and an administrator may be informed of the transactions for follow-up investigation.

Figure 6:
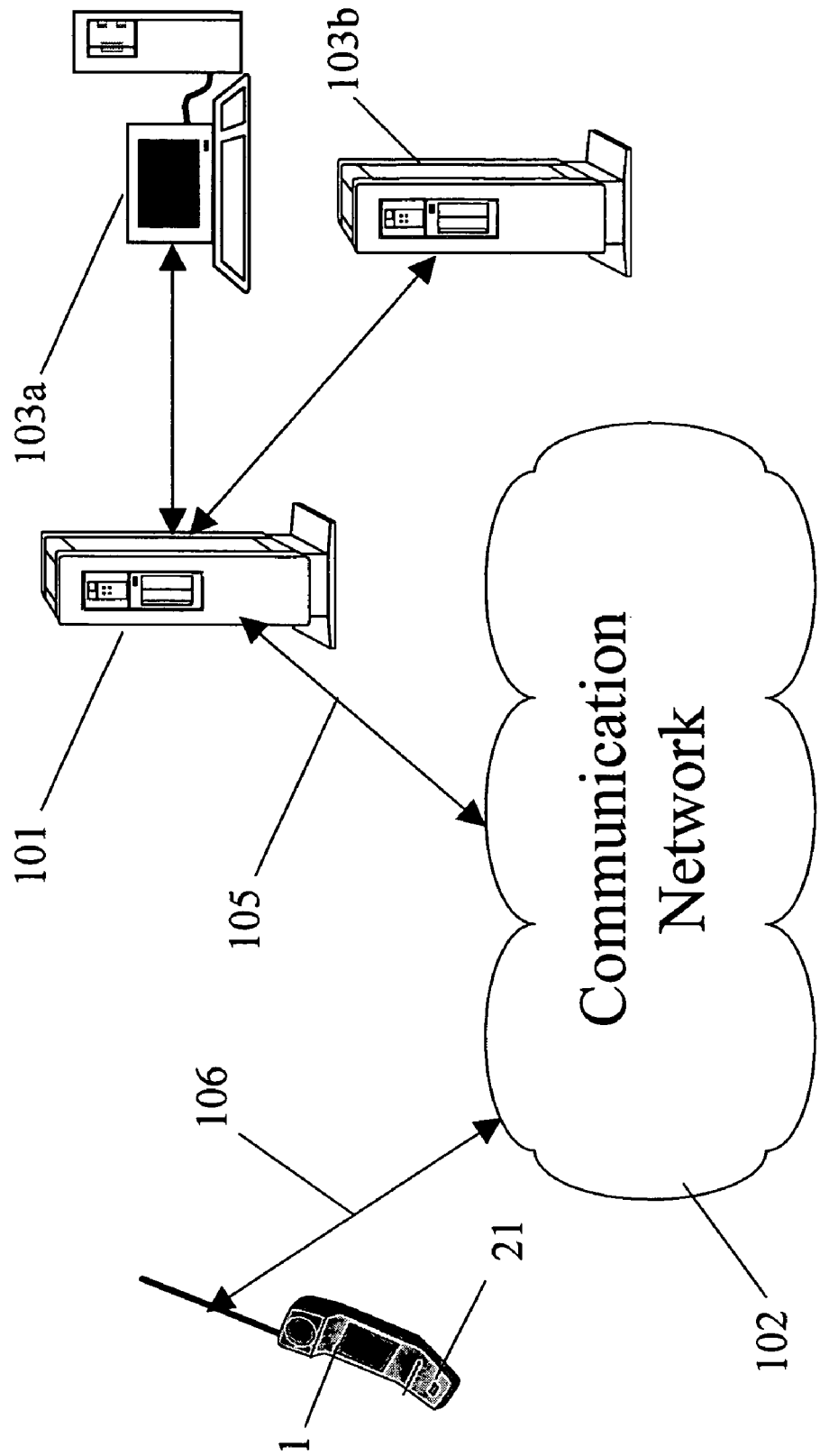
FIG. 6 illustrates a transaction system connected by a communications network that may be used in conjunction with the wireless telephone and attachment according to an embodiment of the invention.

FIG. 6 shows a wireless communication network that may be used in conjunction with the attachment and the wireless communication device. The wireless communication device 1 or attachment 21 may establish a communication link via the communication network 102 with a remote computer or server 101 using the antenna in the wireless communication device 1. The communication network 102 may include hardware (base stations, servers, routers, switches and the like) for establishing a communication link between the wireless communication device 1/attachment 21 and the remote computer or server 101. For example, in an embodiment in which the wireless communication device 1 and attachment 21 communicate with the remote computer using the Wireless Application Protocol, the communication network 102 may include a WAP gateway server that retrieves information from the remote computer or server 101 in Hyper-Text Transfer Protocol (HTTP) or Secure Hyper-Text Transfer Protocol (HTTP-S) format and encodes this information in Wireless Session Protocol (WSP), Wireless Transaction Protocol (WTP) and/or Wireless Transport Layer Security (WTLS) for transmission to the antenna 5 of the wireless communication device 1.

The communication sublink 106 between the communication network 102 and the wireless communication device 1/attachment 21 may be wireless, while the communication sublink 105 between the communication network 102 and the remote computer 101 and the communication sublinks between hardware components internal to the communication network 102 itself may be wireless links, land lines or a combination thereof. The "communication link" between the wireless communication device 1/attachment 21 and the remote computer or server 101 may therefore include portions of the communication network 102 as well as communication sublinks 105 and 106. It is readily understood by people of ordinary skill in the art that the communication link between the wireless communication device 1/attachment 21 and the remote computer 101 may be a dynamic set of hardware components and communication sublinks. For example, in embodiments of the invention in which the communication network 102 is a packet-switched network, the communication sublinks and hardware components within the communication network 102 may change from packet to packet during the same communication session.

In embodiments of the invention, the remote computer or server 101 may actually be comprised of several components, such as a firewall, a gateway server, a database server, and a processing server. The firewall may be used to prevent access to the remote computer or server 101 by unauthorized users. Accordingly, the messages sent to the remote computer or server 101 may include a password or other identification information indicating the identity of the user. Access to the remote computer or server 101 may be denied if the message is not accompanied by a valid password or identification information. The password or identification may be validated once at the beginning of a communication session or with the receipt of each message by the remote computer or server 101.

The gateway server may format the incoming information and transmit it to the database server for storage. The stored information may be retrieved from the database server by the processing server. The processing server may determine when and whether additional information must be retrieved from affiliated computers 103a and 103b (e.g., information from the a user-provided computer indicating whether sufficient quantities of the product being sold are available) or when information must be sent to the affiliated computers 103a and 103b for further processing (e.g., sending credit card information to a server provided by the credit card issuer).

During the communication session with the wireless communication device 1 and/or the attachment 21, the remote computer or server 101 may send or receive information from one or more affiliated computers 103a and 103b. The affiliated computers 103a and 103b may be servers, workstations, terminals, or the like. For example, during a commercial transaction such as a purchase paid for by a credit card issued by a credit card issuer (such as a bank), the remote computer or server 101 may need to retrieve information related to the customer's credit limit or available credit from a server provided by the credit card issuer or may send information about the purchase price to a server provided by the credit card issuer. In an alternative example, the affiliated computer 103a and 103b may be a server provided by the merchant to determine whether the merchant has the appropriate inventory on hand to fill the customer's order. Alternatively, the affiliated computer 103a and 103b may be a workstation or terminal used by an administrator, a registered merchant or the like to access transaction records, update registration information, etc.

Figure 7:
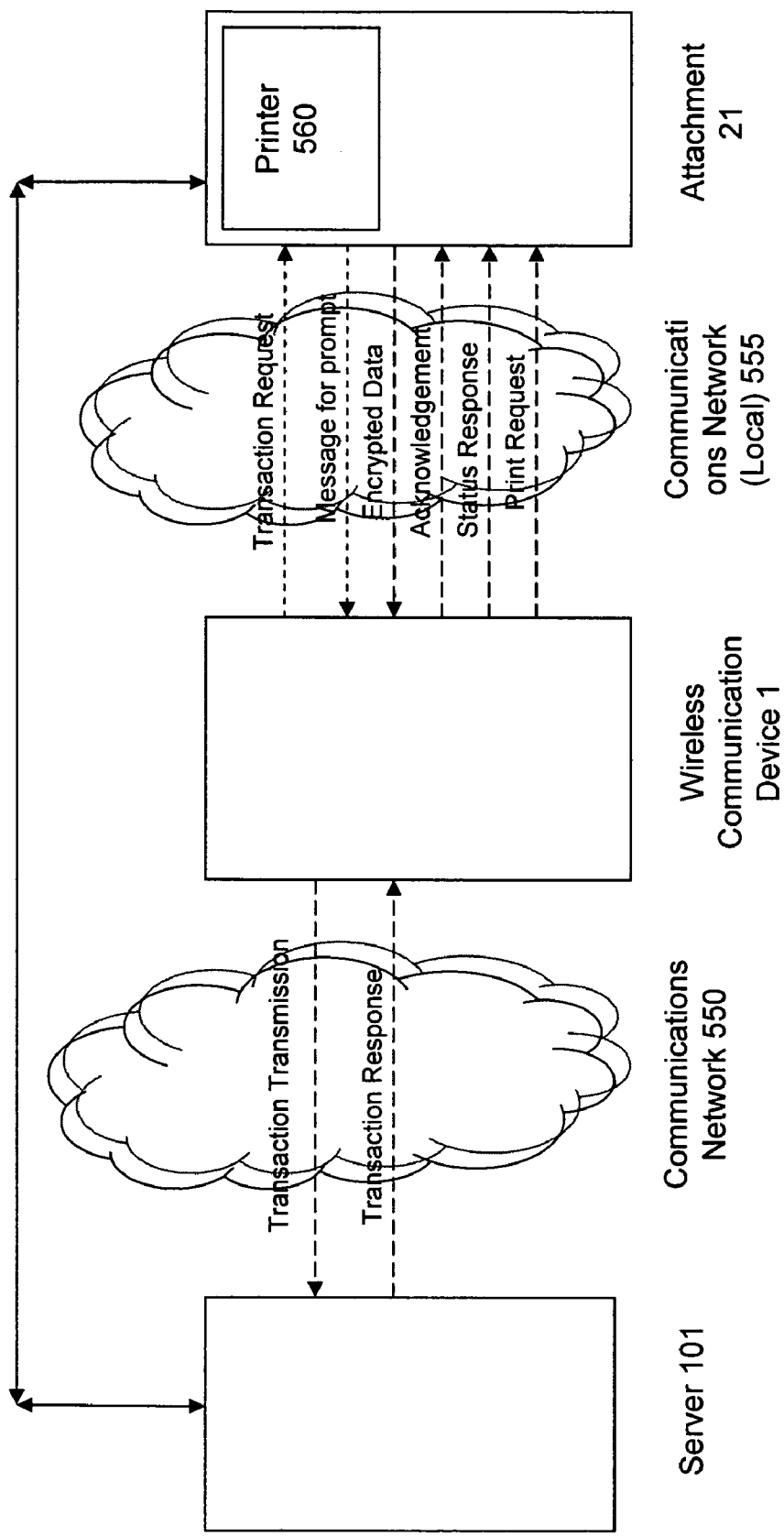
FIG. 7 illustrates implementation of wireless communication between a wireless communication device and an attachment according to an embodiment of the present invention.

FIG. 7 illustrates an implementation of wireless communication between a wireless communication device and an attachment according to an embodiment of the present invention. A communications system includes a remote computer or server 101, a communications network 550, a wireless communication device 1, a local or localized communication network 555, and an attachment 21. In an embodiment of the invention, the attachment 21 may include a printer 560. In this embodiment of the invention, the wireless communication device 1 supports and is able to communicate with other wireless enabled devices via a localized wireless protocol. In an embodiment of the invention, the local or localized wireless protocol may be a BLUETOOTH protocol or may be an IEEE 802.11(a), (b), (d), (n), (i), or (g) wireless protocol. In other words, the communication is may not taking place via a cellular network. In this embodiment of the invention, the wireless communication device 1 may communicate with the attachment 21 over the localized communications network 550 via one of the local wireless protocols identified above. The wireless communication device 1 may have stored upon or host a number of consumer software applications. For example, a Java software application, a Microsoft Smartphone application, and/or a Pocket PC application may be loaded and executable on the wireless communication device 1. The graphical user interface of the wireless communication device 1 allows data entry for the software applications. In an embodiment of the invention, the wireless communication device 1 may be java-enabled which allows for communication with the attachment 21 via a BLUETOOTH interface.

In an embodiment of the invention utilizing the system illustrated in FIG. 7, a wireless commercial transaction application or a wireless identification application may be executed on the wireless communication device 1. Alternatively, a wireless measurement application or other applications which may require security may be executed on the wireless communication device 1. For simplicity, only a commercial transaction is described in regard to FIG. 7, but the application being executed could be a measurement application, an identification application (driver's license application for police), or other similar application. The execution of the application may occur automatically, via a voice prompt, or by a user utilizing the graphical user interface. For example, an option may be selected (within the wireless commercial transaction application) to process a credit card transaction by issuing a credit transaction command. Optionally, an option may be selected to request information from a driver's license, such as would happen when a police office is verifying the authenticity of a driver's license. The wireless communication device 1 may transmit the credit transaction command to the attachment 21 utilizing a localized wireless protocol, e.g., utilizing the BLUETOOTH protocol. In addition, a card or object may be swiped past a reader in the attachment 21 and the attachment may send a message to the wireless communication device to execute a commercial transaction application.

The attachment 21 may receive the transaction request over the localized communications network 555. The reception of the credit transaction request may enable a reading device or reading assembly 23 in the attachment 21. In an embodiment of the invention, the attachment 21 may transmit a message to the GUI of the wireless electronic device 1 prompting a user of the device 1 to move a card past the reader in the attachment 21, e.g., to swipe the credit card or debit card through the reader. The user may move the card past the reader assembly and transaction data may be captured by the reader 23 in the attachment 21. The attachment 21 may encrypt the transaction data captured by the reader 23. The attachment 21 may transmit the encrypted transaction data to the wireless communication device 1 over the localized communications network 555 using a local or localized wireless protocol. The wireless communications device 1 may receive the encrypted transaction data from the attachment 21. The wireless communications device 1 may transmit an acknowledgment message or signal to the attachment 21 identifying that the encrypted transaction or identification data has been successfully received. In an embodiment of the invention, the attachment 21 may receive the acknowledgment message or signal and may enter a hibernation state after reception of the acknowledgment message or signal. The hibernation mode allows conservation of power which is utilized or consumed by the attachment 21.

The wireless communication device 1 may package the encrypted transaction data in a transaction transmission and may send the transaction transmission including the encrypted transaction data to the server 101 over the wireless communications network 550. The wireless communications protocol utilized may be one of the common protocols such as CDMA, PCS, GSM, 802.11, or any wireless protocol utilized by any wireless device, whether it is a cellular phone or a personal digital assistant (PDA). The server 101 may receive the transaction transmission including the encrypted transaction data. The server 101 may decrypt the encrypted transaction or identification data to produce server transaction data.

The server 101 may analyze the transaction transmission including server transaction data to verify authenticity of the user and other server 101 requirements. As described above, the server or remote computer 101 may contact affiliated computers 103 and 103*a* (FIG. 6) depending on the contents of the transaction transmission. After the server 101 and/or affiliated computers 103 and 103*a* have processed and/or analyzed the server transaction data and/or the transaction transmission, the server 101 may send a transaction response to the wireless communications device 1. For example, the transaction response may be a confirmation number or approval number, a transaction denied request, or a request asking a user or the wireless communication device 1 for additional information. Under certain operating conditions, the transaction response may be encrypted. The wireless communication device 1 may receive the transaction response and may display a message representative of the transaction response on the wireless communication device's GUI. In an embodiment of the invention, the wireless communication device 1 may transmit a print instruction to the attachment 21 over the localized wireless communications network 555. The print instruction may include the confirmation or approval number. The attachment 21 may receive the print instruction, convert the instruction to a printer-readable command, and may print a receipt outlining the details of the wireless commercial transaction on the printer 560, which is installed as part of the attachment 21. The user may utilize the receipt for later verification when a credit card or debit card statement or other financial statement is received.

Because the wireless communication device 1 and the attachment 21 do not have to be physically connected and communicate via a localized wireless protocol, a variety of configurations are possible. In the embodiment of the invention including a printer 560 in the attachment 21, the attachment 21 may utilize too large of a space to be physically connected to the wireless communication device 1. In these embodiments, the attachment 21 may be carried in a briefcase, may be placed on a table top or other surface, or may be configured as part of a belt clip attachment. In an embodiment of the invention, the wireless communication device 1 and the attachment 21 may be physically connected and still communicate utilizing a localized wireless communication protocol.

Figure 8:
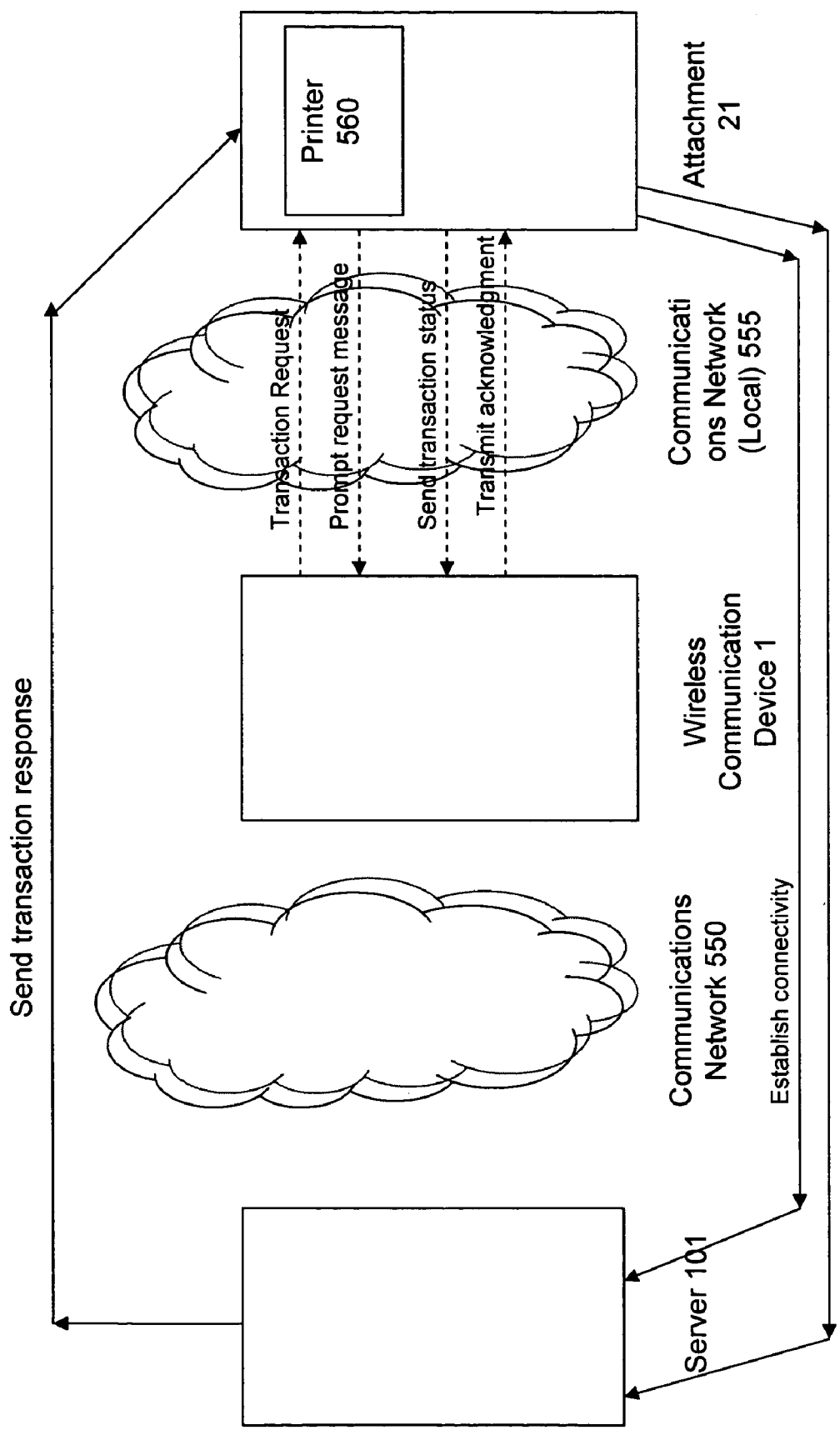
FIG. 8 illustrates an attachment communicating directly with a server or remote computer according to an embodiment of the present invention.

FIG. 8 illustrates an attachment communicating directly with a server or remote computer according to an embodiment of the present invention. In the embodiment of the invention illustrated in FIG. 8, the attachment 21 may detect utilization or the presence of a, for example, IEEE 802.11g or other wireless protocol network. Due to the presence of an IEEE 802.11g or other wireless network, the attachment 21 may communicate directly with the server 101, i.e., without utilizing the wireless communications device 1.

In the embodiment of the invention illustrated in FIG. 8, the wireless communication device 1 may initiate a credit transaction request which is resident on the wireless communication device 1. As discussed above, for simplicity and ease of illustration, only a transaction request is discussed, but a measurement request, an identification request, or other request may also be utilized. Illustratively, a commercial credit application is selected, e.g., automatically, utilizing a GUI, or via a voice prompt, at the wireless communication device 1. The wireless communication device 1 may transmit a credit transaction request or transaction request to the attachment 21. The wireless communication device 1 may utilize a localized wireless transaction protocol, e.g., the BLUETOOTH protocol or the IEEE 802.11(a, b, and g). The attachment 21 may receive the transaction request or identification request which initializes the reader assembly 23 in the attachment 21. In one embodiment of the invention, the attachment 21 may transmit a prompt request message to the wireless communication device 1 to have the wireless communication device 1 display a message requesting the user to start to move a card or object, for example, a credit instrument, e.g., credit card, debit card, or credit radio frequency identification device (RFIID), past the reader assembly 23. Under other operating conditions, the wireless communications device 1 may automatically display this message after or concurrently with transmitting the transaction request to the attachment 21.

After initialization of the reader assembly 23, a card is moved past the reader assembly 23 in the attachment 21 and transaction data is captured by the attachment 21. In the attachment 21, the transaction data is encrypted to create encrypted transaction data. At some point after the attachment 21 is initialized, the attachment 21 may detect or recognize a presence of a localized wireless network, e.g., a network operating under IEEE 802.11g or other wireless protocols. The attachment 21 may establish network connectivity with the server 101 utilizing the localized wireless protocol, e.g., IEEE 802.11g. The establishment of connectivity may occur before, during, or after the time in which the card or object is moved past the attachment's reader assembly 23. After the network connectivity has been established, the attachment 21 transmits or sends encrypted transaction data to the server 101 as part of a transaction transmission over the localized communication network utilizing the 802.11g or another localized wireless communication protocol. Under some operating conditions, the attachment 21 may transmit or send only the encrypted transaction data to the server 101.

In an embodiment of the invention, the server 101 may receive the transaction transmission including the encrypted transaction data from the attachment 21. The server 101 may decrypt the encrypted transaction data to create server transaction data. As described above, the server 101 and/or the affiliated computers 103 and 103*a* may process the transaction transmission including the server transaction data and may send a transaction response to the attachment 21. For example, the transaction response may be authorization of the transaction request, a request for additional information, or rejection of the transaction request. The transaction response may be encrypted. The attachment 21 receives the transaction response from the server 101 and transmits a transaction response status to the wireless communication device 1. The attachment 21 decrypts the transaction response and performs any actions requested in the transaction response. The transaction response status may be included in the transaction response. The transaction response status may be transmitted via a localized wireless communication protocol such as BLUETOOTH. The wireless communication device 1 may receive the transaction response status from the attachment 21 and the selected software application may update the user interface in the wireless communication device 1 to reflect the transaction response status, which, for example, may include a request for additional information.

After the transaction response is received from the attachment 21, the wireless communication device 1 sends an acknowledgment message to the attachment 21. Under certain operating conditions, after receipt of the acknowledgment request from the wireless communication device 1, the attachment 21 may enter a hibernation mode to conserve power. Under other operating conditions, the attachment 21 may initialize an attachment printer 560 to instruct the printer 560 to create a paper copy of the transaction request and transaction results. The paper copy may include details of the transaction, e.g., dollar amounts, date, time, authorization or rejection, approval numbers, vendor ID, etc. As the acknowledgement message is being transmitted to the attachment 21 or after the transmission, the wireless communication device 1 may update the wireless communication device GUI to reflect the transaction results.

In an embodiment of the invention, the attachment 1 may include a display and a keypad (or keyboard). The attachment 1 display may be utilized to display short messages in case the display of the wireless communication device 1 was inoperable or not available. Similarly, a keypad or keyboard may be utilized in situations where a keypad or keyboard input device of the wireless communication device 1 is not utilized or operational.

Figure 9B:
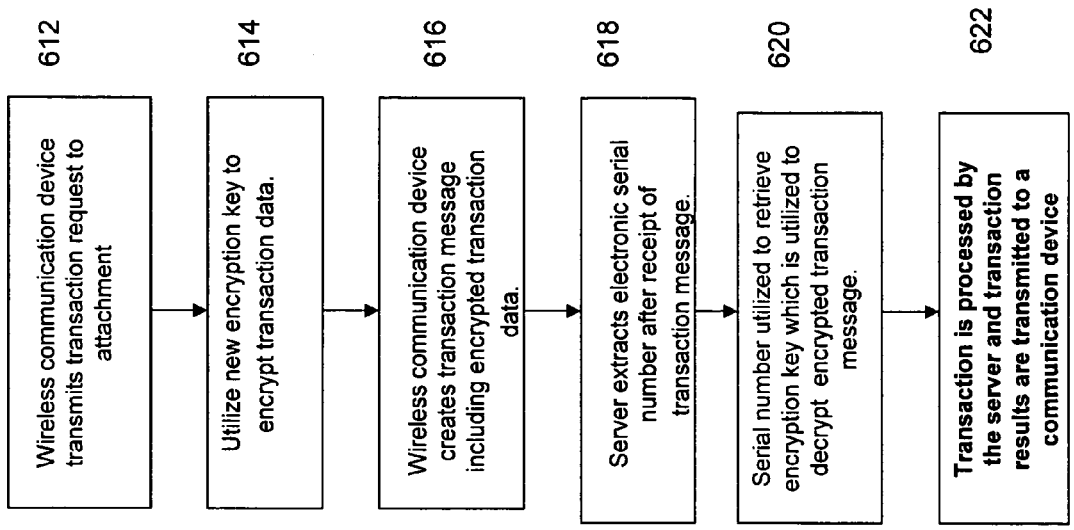
FIGS. 9(a), 9(b), and 9(c) illustrate flowcharts of an encryption process utilizing encryption keys according to an embodiment of the present invention.
Figure 9A:
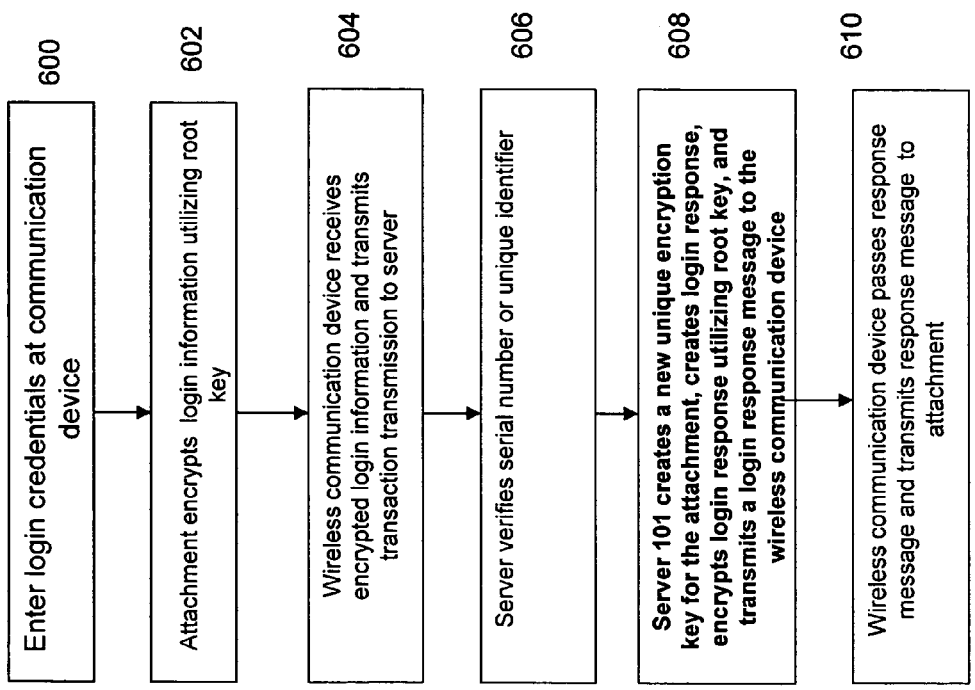

FIGS. 9(*a*), (*b*), and (*c*) illustrate flowcharts of various levels of an encryption process utilizing encryption keys according to an embodiment of the present invention. FIG. 9(*a*) illustrates encryption during a first time an attachment is utilized according to an embodiment of the invention. The first time an attachment is utilized, i.e., the initial login on the very first use of the attachment, a user of a wireless communication device 1 may enter login credentials or identification 600 during execution of a commercial transaction application. The wireless communication device 1 may have capabilities of utilizing the attachment 21 and the login credentials or information is transmitted to the attachment 21. As described above, a commercial transaction application is described for ease of illustration, but similar operation occurs if utilizing an identification application or a measurement application.

In this initial or first login attempt to the attachment 21, a root key or pre-installed key is utilized to encrypt 602 the login information and to create encrypted login information. The root key or pre-installed key may be stored in a working memory of the attachment 21. In an embodiment of the invention, the working memory may have a non-volatile section and a volatile section. The root key or pre-installed key may be stored in the non-volatile section. The encrypted login information may include a serial number or unique identifier that identifies and is unique to a specific attachment 21. The wireless communication device 1 receives the encrypted login information from the attachment 21, creates a transaction transmission including the encrypted login information, and transmits 604 the encrypted login information through the wireless communication device to the server 101. Under other operating conditions, the attachment 21 communicates directly with the server 101 without utilizing the wireless communication device 1.

The server 101 receives the transaction transmission including the encrypted login information from the wireless communication device 1 and decrypts the encrypted login information. The server utilizes the root key to decrypt the encrypted login information. Specifically, under certain operating conditions, the server 101 extracts the unique identifier or serial number from the transaction transmission and verifies 606 the unique identifier or serial number is one for an authorized device (attachment or peripheral). In an embodiment of the invention, the serial number or unique identifier is also included as part of the encrypted login information. Thus, under these operating conditions, the serial number or unique identifier extracted from the transaction transmission is compared to the serial number or unique identifier extracted from the encrypted login information for additional verification purposes.

After verification, the server 101 creates 608 a new unique encryption key for the attachment 21 and encrypts a login response including the new unique encryption key utilizing the previous key, in this case the root key. The server 101 transmits a login response message including the new unique encryption key to the wireless communication device 1. The wireless communication device 1 receives the login response, passes on 610 the new unique encryption key, and transmits the encrypted payload including the new unique encryption key to the attachment 1. Under these operating conditions, the wireless communication device 1 is just a pass-through device. The wireless communication device 1 displays the status of the login, based on contents of the login response message, on the user interface of the wireless communication device 1. In an embodiment of the invention, the server 101 may transmit a login response message including the new unique encryption key directly to the attachment 21. In either embodiment, the attachment 21 decrypts the encrypted payload utilizing the current encryption key, or root key, and extracts the new encryption key from the decrypted data. In other words, the key being transmitted was encrypted. In an embodiment of the invention, the new unique encryption key is stored in a non-volatile section of an internal memory. Under certain operating conditions, the attachment may transmit the login response message, including a login status, to the wireless communications device 1 to allow the wireless communication device 1 to display a successful login on the user interface.

FIG. 9(B) illustrates the exchanging of encrypted information, such as transaction information, according to an embodiment of the invention. After the initial or first utilization of the attachment 21, encrypted information is exchanged during each wireless transaction between the attachment 21 and the server 101. The next time a commercial transaction is requested by a user or automatically by the wireless communication device 1, the wireless communication device 1 transmits 612, for example, a transaction request to the attachment 21. The attachment 21 may utilize the new unique encryption key to encrypt 614 transaction data that is captured by the reading assembly 23 and create encrypted transaction data. Under certain operating conditions, the encrypted transaction data includes an electronic serial number or unique identifier. The encrypted transaction data is then transmitted from the attachment 21 to the wireless communication device 21.

The wireless communication device 1 creates or builds 616 a transaction message containing the encrypted transaction data transmitted from the attachment. The wireless communication device transmits the transaction message to the server 101. The server 101 receives the transaction message and extracts 618 the electronic serial number or unique identifier from the transaction message. The electronic serial number or unique identifier may be utilized by the server 101 to lookup or retrieve the new unique encryption key corresponding to the attachment 21 from a lookup table or database in the server that houses the attachment unique identifiers and corresponding assigned encryption keys. The retrieved encryption key is utilized to decrypt 620 the encrypted transaction data which creates server transaction data. For example, the new unique encryption key may be utilized to decrypt the encrypted data. The transaction is processed by the server and transaction results are created by the server 101. The transaction results are encrypted utilizing the new, unique encryption key and are transmitted 622 to an originating communication device, e.g., the wireless communication device 1 or the attachment 21. After receipt of the transaction results, the transaction results are displayed on the user interface of the wireless communication device 1. The attachment 21 may decrypt the transaction results utilizing the new unique encryption key. Under certain operating conditions, the attachment 21 may enter a hibernation mode after the transaction results are received.

Figure 9C:
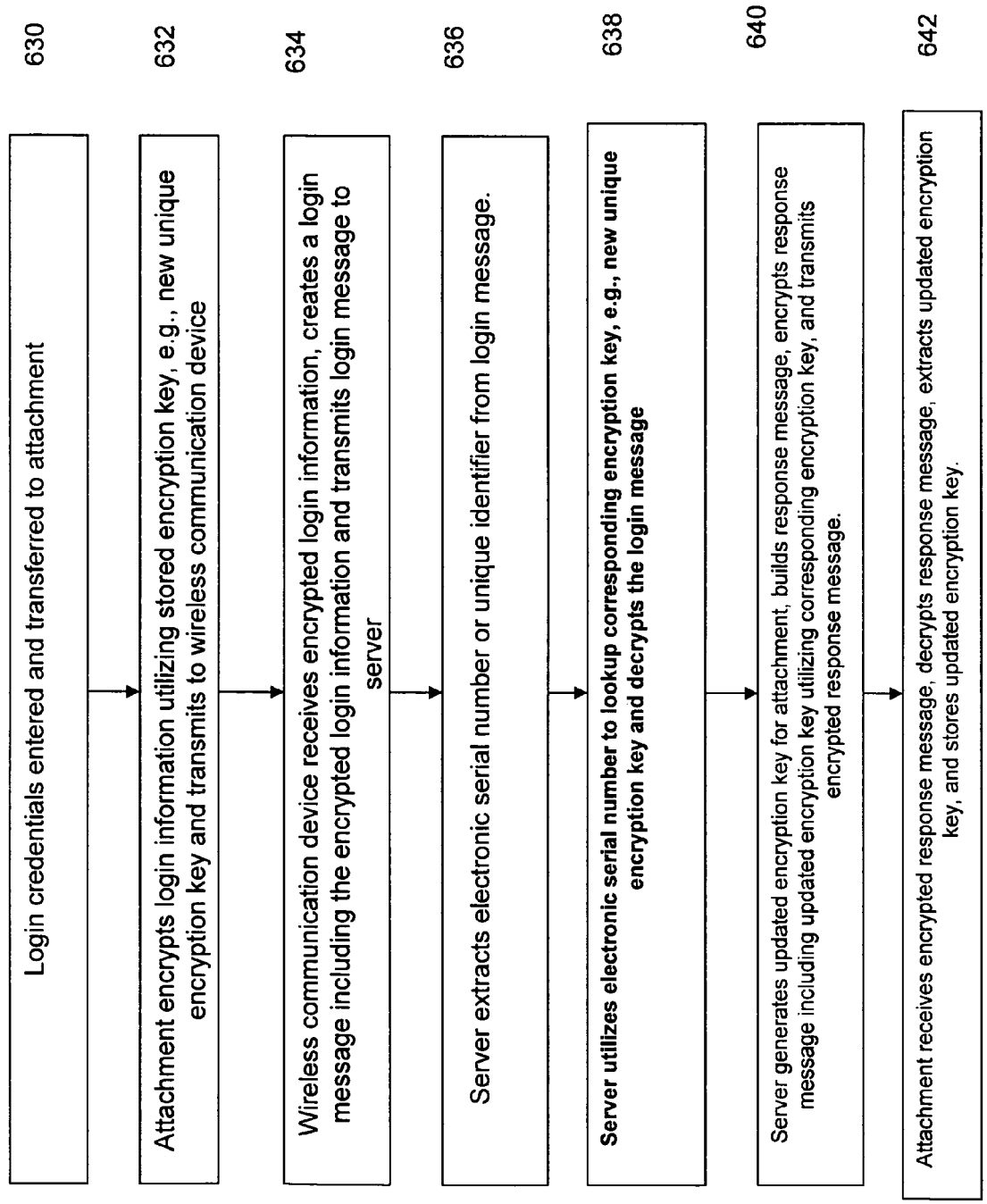

In order to increase security when utilizing the attachment, encryption keys are modified each time a new transaction is utilized or requested. FIG. 9(c) illustrates exchanging of encryption keys between an attachment and a server according to an embodiment of the present invention. If a new transaction is requested, by the wireless communication device 1, login credentials are entered. The login credentials are transmitted 630 from the wireless communication device 1 to the attachment 21. The currently stored encryption key, i.e., the new unique encryption key described above, is utilized to encrypt the user's login credentials and create encrypted login credentials. The encrypted login credentials are transmitted 632 to the wireless communication device 1. The wireless communication device 1 creates or constructs a login message including the encrypted login credentials and transmits 634 the login message including the encrypted login credentials to the server 101. In an embodiment of the invention, the attachment 21 may create a login message and transmit the login message including the encrypted login credentials to the server 101.

The server 101 receives the login message and extracts the electronic serial number or unique identifier 636 from the login message. The server 101 utilizes the electronic serial number or unique identifier in the login message to recover or retrieve 638 the new unique encryption key that corresponds to the attachment 21. Under certain operating conditions, the new unique encryption key is stored in the lookup table or database in the server 101. The new unique encryption key decrypts the encrypted login information. Because this is a new transaction request or a new login, the server 101 generates an updated encryption key. The server 101 creates or builds a response message, including a login status and the updated encryption key, encrypts the response message with the old key (in this case the new unique encryption key), and transmits 640 the encrypted response message including updated encryption key to the wireless communication device 1. The wireless communication device 1 receives the response message and transmits the updated encryption key to the attachment 21. The attachment 21 receives 642 the encrypted response message, decrypts the encrypted response message utilizing the new unique encryption key to create a decrypted response message, extracts the updated encryption key from the decrypted response message, and stores the updated encryption key in a non-volatile section of the attachment memory, such as an internal memory of the attachment 21. Under certain operating condition, the attachment 21 may transmit transaction results to the wireless communication device 1 and the wireless communication device 1 may display the transaction results on its display.

Initially, the server 101 may need to be configured with information of attachments or peripherals created and shipped by the manufacturer, and corresponding serial numbers, pre-installed keys, or root keys. A merchant may desire to establish an account on the server 101 in order to allow a plurality of terminals, i.e., wireless communication devices and attachments, to utilize the transaction, measurement, or identification applications on the wireless communication device 1. A merchant may apply for an account and a personal web page may be created at a specific uniform resource locator for the merchant. Under certain operating conditions, the merchant may login to the personal web page and after physical receipt of the plurality of terminals, may enter in the serial numbers or unique identifiers for each of the plurality of terminals. This information is utilized to create the lookup table or database described above where each attachment serial number is listed along with a corresponding encryption key. Under certain operating conditions, the merchant may also have to enter the root key or pre-installed key. Under certain operating conditions, the server 101 may have a table established by the manufacturer of the attachment listing serial numbers or unique identifiers and corresponding root keys or pre-installed keys.

As identified above, encryption is utilized by the present invention for encrypting transaction data and for encrypting login information. In addition, the attachment 21 may encrypt other secure information, such as manually entered credit card information or other keyboard or keypad entered data, as necessary.

Figure 10:
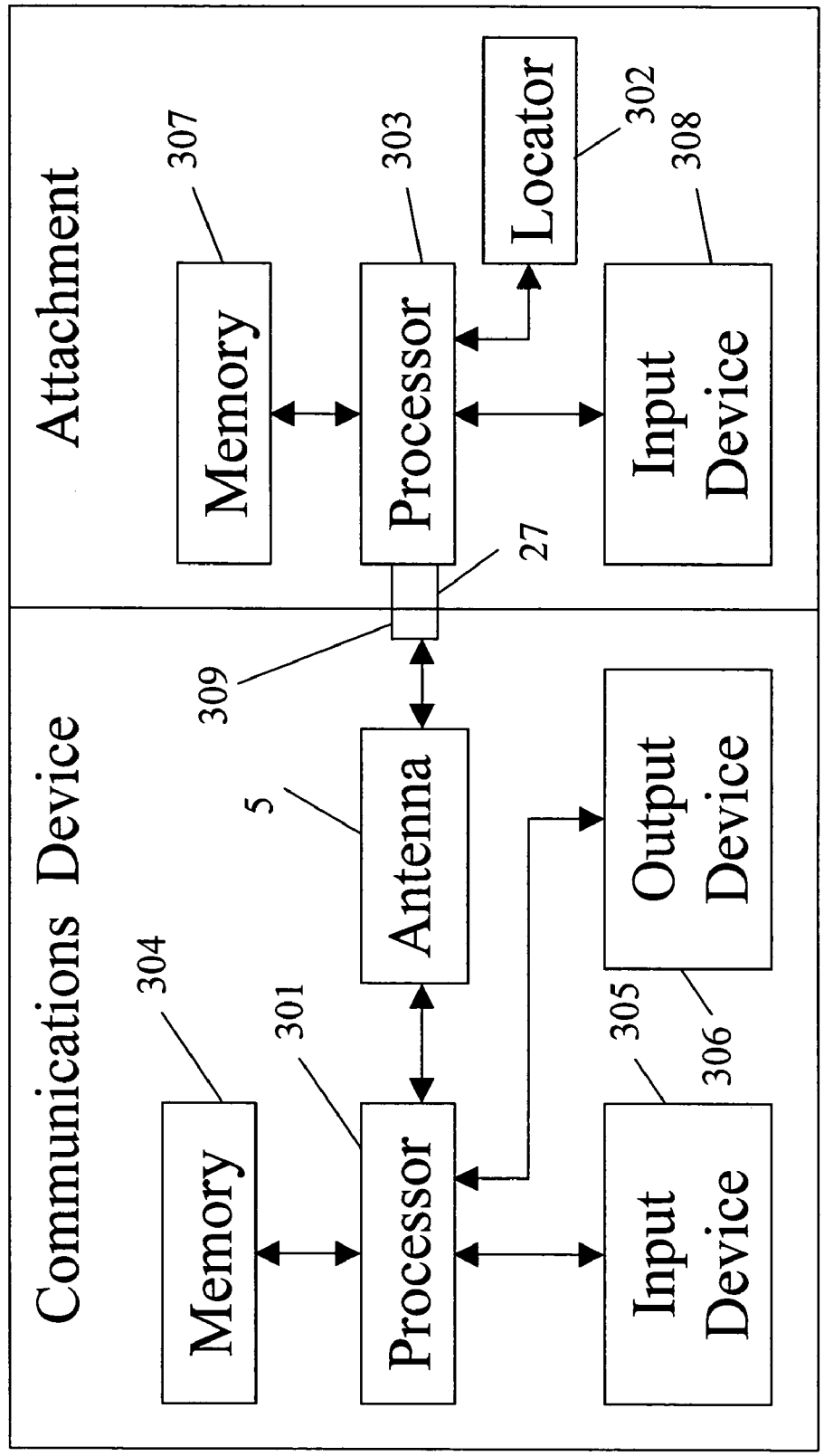
FIG. 10 shows, in block diagram form, components of the wireless communication device and the attachment according to an embodiment of the present invention.

FIG. 10 shows a block diagram of a wireless communication device 1 and an attachment 21 according to an embodiment of the present invention. Under other operating conditions, the attachment 21 may be referred to as a peripheral. The processor 301 of the wireless communication device 1 may execute one or more software application for prompting the user for input, processing user input (received from the input device 305), transmitting and receiving information over the communication network, and outputting information to the user (via output device 306). Although only one input device 305 and one output device 306 are shown, multiple input and output devices may be provided (as described with respect to FIG. 1).

For example, where the wireless communication device 1 is a cellular telephone, the processor may process a telephone number or a personal identification number associated with a customer's credit or debit card that is input by the user through the alphanumeric keypad 9. The software application(s) executed by the processor 301 of the wireless communication device 1 may be written in the JAVA 2 Platform Micro Edition (available from Sun Microsystems, Inc. of Palo Alto, Calif.), Wireless Application Protocol (WAP) or any other suitable programming language. The software application, as well as other data, may be stored, either permanently or temporarily, in memory 304. In embodiments in which the processor 301 of the wireless communication device 1 executes a WAP application, it may receive and transmit data using one or more existing wireless services, such as Short Message Service (SMS), Circuit Switched Data (CSD), General Packet Radio Service (GPRS) or Unstructured Supplementary Services Data (USSD).

Although illustrated in FIG. 10 as single blocks, the processor 301 of the wireless communication device 1 and the processor 303 of the attachment 12 may actually incorporate multiple microprocessors and/or other electronic components, such as digital signal processors (DSP), interface controllers (e.g., to interface with the input and output devices), audio amplifiers, RF amplifiers and the like. For example, in an embodiment in which the wireless communication device 1 is a cellular telephone, the processor 301 in the wireless communication device 1 may include an A/D converter to convert audio input received at the microphone 8 to digital data, a filter to improve the quality of the digital data, and the like. Furthermore, although the antenna 5 is shown as a single block in FIG. 3, the antenna 5 may actually include microprocessors and/or other electrical components, such as digital signal processors, RF amplifiers, and the like, in addition to a physical antenna.

The attachment 21 may also include a processor 303, a memory 307 and an input device 308. The processor may execute a software application (which may be stored in the attachment memory 307) allowing the processor to receive input information from the input device 308 and process the input information to generate data for transmission to a remote computer 101 via the antenna 5 of the wireless communication device 1. By executing the software application, the attachment may determine from which input device 308 it is receiving input information (if multiple input devices are provided), encrypt the input information, append additional information indicating the identity or location of the user (using locator 302, which may be a GPS position sensor and/or processor or a processor for measuring signal strength from multiple base stations of the communication network to determine the attachments location by triangulation), divide the input information into data packets suitable for transmission over the communication network 102, etc.

In embodiments of the present invention, the processor 301 of the wireless communication device 1 and the communication port 309 that is electrically coupled to the processor 303 of the attachment 21 may be connected to the antenna 5 by a logical bus. Accordingly, each of the antenna 5, the processor 301 of the wireless communication device 1, and the communication port 309 (and/or the processor 303 of the attachment 21) may have a unique bus address. Although messages communicated over the bus may be relayed to all other components of the bus, the message may contain the bus address of the component for which the message was intended. In this way, the message is only processed by the intended component. Thus, for example, messages transmitted to the antenna 5 by a remote computer 101 may be transmitted from the antenna 5 to both the processor 301 for the wireless communication device 1 as well as the processor 303 for the attachment 21. However, if the message is intended for the processor 303 of the attachment 21 (and addressed accordingly), the message will be ignored by the processor 301 for the wireless communication device 1. In such embodiments of the system, it may be possible for the remote computer 101 to send "acknowledgement" or "ACK" messages to the attachment 21 to indicate that attachment-processed data transmitted by the attachment 21 or a portion thereof (e.g., a packet) has been properly received. The remote computer 101 may also send messages to the processor 303 of the attachment 21 to prepare the processor 303 to receive input information from a particular input device 308.

In an alternative embodiment, the processor 303 of the attachment 21 may be connected to the antenna 5 by a one-way communication link that transfers information from the processor 303 to the antenna only. The processor 303 may reset itself every time it transmits attachment-processed data to the antenna 5. In such an embodiment, the processor 303 may not need to receive an ACK message. Instead, the processor 301 of the wireless communication device 1 may determine the state of the transaction based on a response received from the remote computer 101. For example, if a credit card number is properly transmitted to the remote computer 101 and received, the remote computer 101 may return a response continuing the transaction (e.g., requesting a PIN code). However, if the credit card number is not properly received, the processor 301 of the wireless communication device 1 may not receive a response. Accordingly, it may stay in a state in which it instructs the user to input information using the attachment 21.

In embodiments of the invention, the memory 307 of the attachment 21 may be inaccessible to the user. This may serve to prevent unscrupulous users from storing and accessing sensitive information (such as purchaser credit card information) without authorization. Accordingly, the memory 307 may be read-only memory (ROM) and may be temporary (volatile) in nature. Alternatively, the attachment may have no user interface device to allow the user to access the memory 307. In such embodiments, the wireless communication device 1 may also be prevented from accessing the memory 307 of the attachment 21 as well. As discussed below, in such embodiments, the processor 303 of the attachment 21 may encrypt input information received from the attachment's input device 308 so that the resulting attachment-processed data cannot be read off the antenna by the processor of the wireless communication device 1 (or the logical bus) for misuse by the user.

Figure 11:
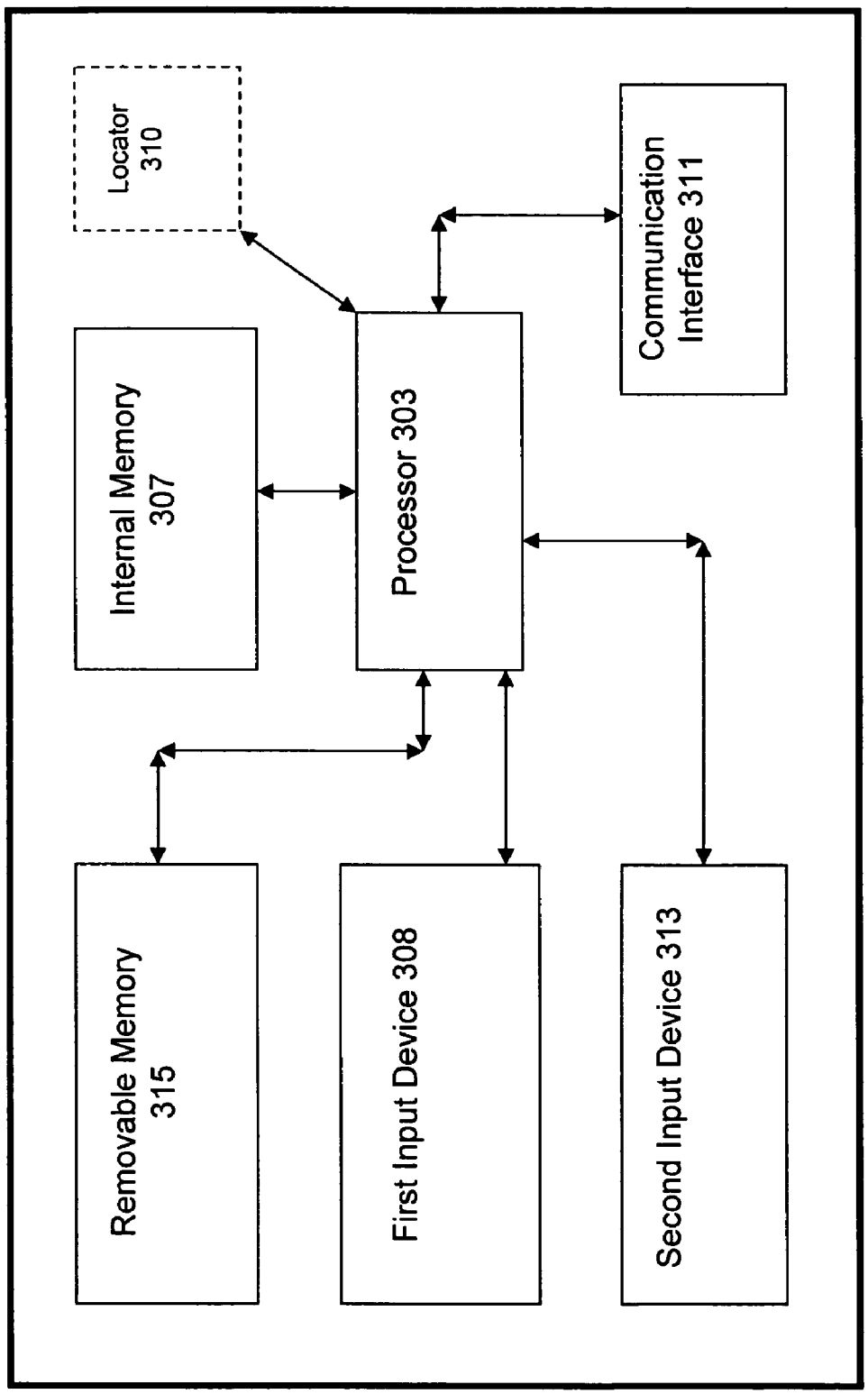
FIG. 11 illustrates a second embodiment of an attachment according to an embodiment of the present invention.

FIG. 11 illustrates a second embodiment of an attachment according to an embodiment of the present invention. The second embodiment of the attachment includes a processor 303, an internal memory 307, an input device 308, a removable memory 315, a second input device 313, and a communications interface 313. The attachment may be referred to as a peripheral. The attachment may also include a locator 302. The communication interface 311 may allow or utilize communication via wired or wireless communications. The attachment may be utilized for commercial transaction applications, measurement applications, identification applications, and other sensitive personal data applications. For simplicity and ease of illustration, commercial transaction applications are discussed below.

As described in FIG. 10, the processor 303 is a separate processor located within the attachment 21. As described above, the attachment 21 may include all of the features discussed above in regard to FIG. 10. Generally, the processor 303 is responsible for controlling the hardware components located within the attachment 21. The processor 303 may also include software or code that enables or executes encryption processing on any transaction data or identification data. In an embodiment of the invention, the encryption is performed before the data is transmitted to the communication interface 311. In an embodiment of the invention, encryption is performed before storage of any transaction, measurement, or identification data in the removable memory 315 or the internal memory 307. The internal memory 307 may be a volatile memory that is utilized by the processor 303 as workspace for its processing. The internal memory 307 may also have a non-volatile section. The non-volatile section of the internal memory may store the encryption key currently utilized by the attachment 21. The internal memory 307 may also be utilized by a wireless communication device 1 or a server 101 if temporary storage is required. The communication interface 311 is utilized to connect to a wireless communication device 1 in one embodiment and to a server 101 in a second embodiment. The communications interface 311 may transmit information from the attachment processor 303 or one of the attachment memories 307 or 315 to a wireless communication device 1 such as a cellular phone or a personal digital assistant. The wireless communications interface 311 may also support the transmitting to and receiving of information to a local area network if the local area network supports wireless protocols, such as IEEE 802.11g. In other words, in an embodiment of the invention, no component of the wireless communication device 1 may need to be utilized to transmit information to the server 101 and/or local area network. The local area network may include or may be coupled to a server or remote computer 101.

The removable memory 315 provides an increase in the available memory in the attachment 21. The removable memory 315 may be utilized to store application data or user specific data. In an embodiment of the invention, the removable memory 315 may be non-volatile. The removable media may be utilized to transfer user data or application specific data from one device to another device. For example, user preferences to customize the use of the application and use of the attachment may be moved from one device or terminal to another. In addition, merchant information could be stored on the removable media. The removable memory 315 may be Secure Digital removable media, Compact Flash Type II/III removable media, a Memory Stick, or a MicroDrive removable media. In one embodiment of the invention, the processor 303 controls access to the removable memory 315.

Data stored on the removable memory 315 may be encrypted. A media key, which is a key used to access data stored on the removable memory 315, may be stored at the server 101 for utilization with the attachment at a later period of time. The media key may be distributed to the attachment 21 when data from the removable memory 315 is required. Under certain operating conditions, a media key corresponds to a user. Under certain operating conditions, a media key corresponds to the removable memory 315.

Under other operating conditions, during login of the attachment, the attachment 21 may transmit information identifying that a removable memory reader is present, and thus a removable memory 315 may be utilized. The attachment 21 may also transmit login information for the user. As described above, the information identifying presence of the removable media and the login information may be encrypted utilizing the encryption key which is stored in the internal memory of the attachment 21. After receipt of this information from the attachment 21, if a media key has not been assigned for the user, the server 101 may retrieve a media key, or assign or create a media key specifically for the attachment 21 and the specific removable memory 315, and store this in a memory or database in the server or remote computer 101. If a media key has been assigned, the server 101 retrieves the media key for the user utilizing the unique identifier or serial number, which was also transmitted from the attachment 21.

If data located in the removable memory 315 is required by the server 101 or wireless communication device 1, the newly assigned media key or existing media is transmitted from the server or remote computer 101 to the wireless communication device 1 or the attachment 21. The server or remote computer 101 will encrypt the media key utilizing the current encryption key assigned to or corresponding to the attachment 21. In other words, the transmission of the media key is secured by the same encryption process as described above. At the attachment 21, the payload or response message including the media key is decrypted utilizing the currently stored encryption key. The media key is then stored in a volatile memory in the attachment, e.g., a volatile section of the internal memory 107. Accordingly, if the removable memory 315 is removed from the attachment, the media key may be erased. Similarly, if the attachment 21 is powered down, the media key is erased. If the attachment is placed in a hibernation state, the media key is not erased because the memory is still being refreshed. The renewal of or updating of the media key is managed and directed by the server or remote computer 101 in a similar process or fashion as described above, as illustrated in FIG. 9(*c*).

Some wireless communication devices 1 may not have a large memory capacity. Due to the limited memory capacity, the removable or expanded memory 315 of the attachment 21 may be used to store application specific data for a given user or for a given wireless communication device 1. The application which utilizes the application specific data may reside on and be executed on the wireless communication device 1. The processor 303 may act as a proxy or intermediary between the application on the wireless communication device 1 and the expanded memory or removable memory 315. Under certain operating conditions, the expanded memory 315 may be utilized for the secure storage of sensitive data, i.e., transaction data such as credit card numbers, if either of the wireless communication device 1 or the attachment 21 are unable to connect or communicate with the server 101. For example, the communication interface 311 internal to the attachment 21 may not be operating or the local area may have interference that interrupts the wireless communication service. The secure data is stored until the server 101 can be connected to or is operational for communication. Under certain operating conditions, the removable memory 315 or expanded memory may be utilized to store user preferences for the application residing on the wireless communication device 1, such as a favorite list, an address book, or menu options, etc. Under some operating conditions, the processor 303 may require additional storage space when it is performing complex operation and the removable memory or expanded memory 315 may be utilized by the processor. For example, when the processor 303 is utilizing OCR recognition or analyzation, extra memory space may be needed and the processor 303 may utilize the removable memory or expanded memory 315. The removable memory or expanded memory 315 may also be utilized to distribute firmware upgrades to the attachment 21 or possibly the wireless communication device 1 if the wireless or over-the-air operation is not favorable.

The first input device 308 refers to input devices or readers such as magnetic card readers, smart card readers, or infrared readers. The processor 303 may initiate the first input device 308 after receiving a transaction request from the wireless communication device. Alternatively, the processor 303 may initiate the first input device 308 if a card is inserted into the first input device, in the case of magnetic card readers or smart cart readers, or, in the case of the infrared reader, if the infrared reader senses or detects a presence of a card. Transaction data acquired or read from the first input device 308 is transferred to the processor 303 for processing. The transaction data may be stored temporarily in an internal memory 307. Under other operating conditions, the transaction data may be stored in a removable memory 315. After the processor 303 processes the transaction data, the transaction data may be transferred to the communications interface 311.

The second input device 313 may be an optical input device. In other words, a reader in the second input device 313 may be a one-dimensional bar code reader, a two-dimensional bar code reader, a check magnetic ink character recognition (MICR) reader, or an optical scanner. The optical digital transaction data read by the second input device may be transmitted to the processor 303 for processing or analyzation. Under other operating conditions, the optical data may be optical analog transaction data. Under certain operating conditions, the internal memory 307 may store some or all of the optical digital transaction data on a temporary basis. Under other operating conditions, some or all of the optical digital transaction data may be stored in the removable memory 315. In embodiments of the invention, e.g., (if an optical scanner, a MICR reader, or a bar code reader is utilized), the processor may execute application software that analyzes the optical digital transaction data after receipt of the optical transaction data from the second input device. Illustratively, the processor 303 may execute an optical character recognition algorithm on the captured optical digital transaction or identification data in order to convert the optical digital transaction or identification data into digital transaction data recognizable by the wireless communication device 1 or a server 101. Under some operating conditions, the conversion of the optical transaction data into digital transaction data occurs before the encryption of the transaction data.

In an embodiment of the invention, the second input device may be a global positioning system (GPS transceiver). The GPS transceiver, also referred to as a locator 302, may receive location information from a GPS transmitter or a GPS satellite. This information may be transferred to a processor 303 and under certain conditions, the processor 303 may utilize the information to determine whether a user has processed recent transactions or identifications from two locations that are greater than a specified distance from each other. Under other operating conditions, the server 101 may determine if two recently processed transactions from two locations greater than a specified geographical distance apart.

In an embodiment of the invention, the second input device may be a biometric reader. In this embodiment of the invention, the optical digital transaction data may be captured by the biometric reader. Biometric readers may include fingerprint recognition devices, retina scanners, facial scanning devices, etc. The processor may receive the optical digital transaction data/optical analog transaction data, and may convert the optical digital transaction data/optical analog transaction data into a computer interpretable form, .e.g., digital identification data. Information collected via a biometric reader may be utilized during the login process to verify an authorized user is utilizing the attachment. A biometric reader may also be utilized in conjunction with a first input device, which captures transaction data such as credit card number, name of individual, etc. The processor 303 may convert the optical digital transaction/identification data into identification data. The processor 303 may compare the identification data against the transaction data to verify that the user of the device is also the owner of the credit card, debit card, driver's license, personal ID card. Under other operating conditions, the processor 303 may not compare the transaction data to the identification data and may transfer both to the server 101 where the comparison takes place.

Figure 12:
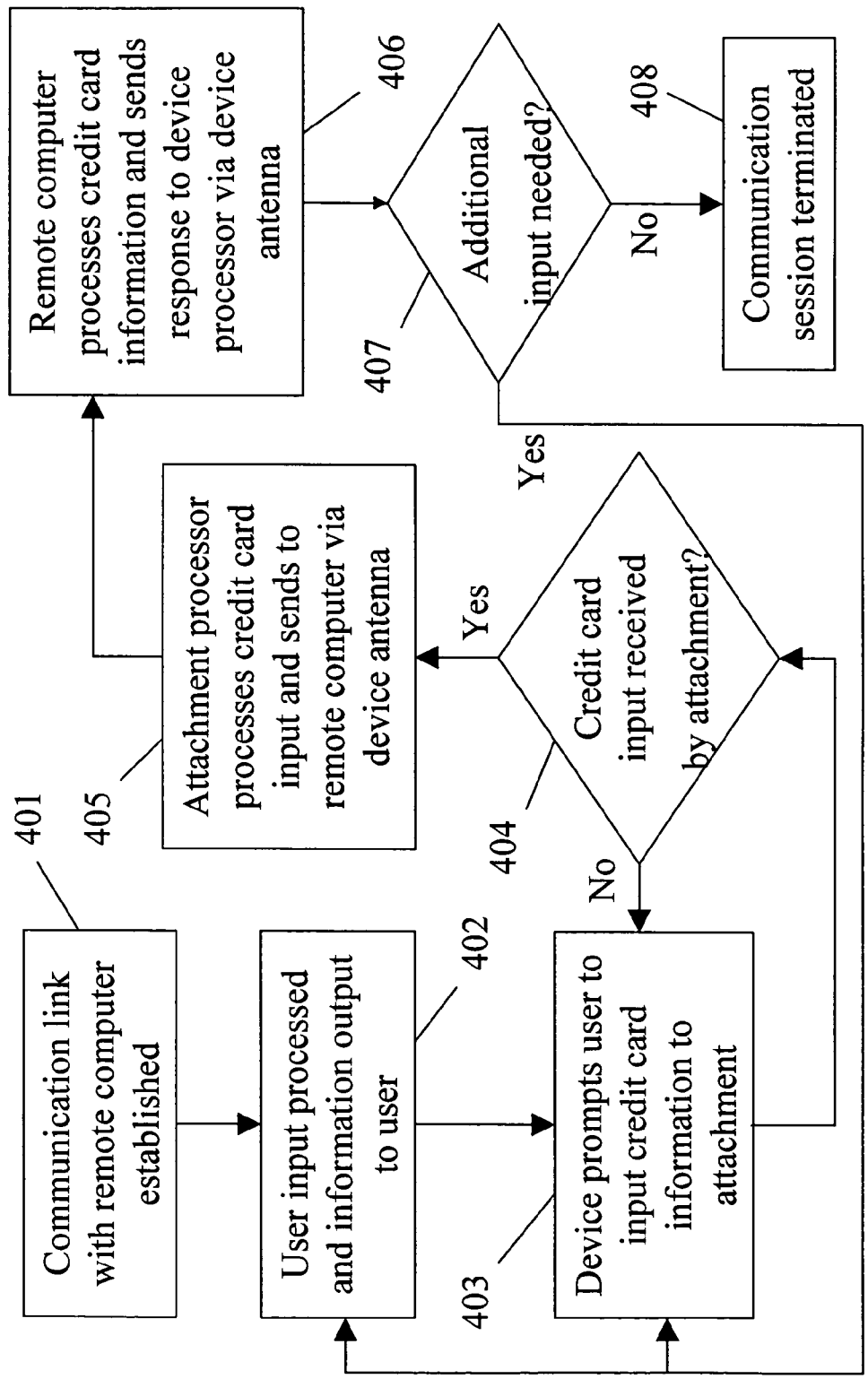
FIG. 12 shows a flowchart for a credit card purchase transaction that may be performed using the attachment, a wireless communication device and a transaction system according to an embodiment of the invention.

FIG. 12 is a flowchart showing the steps involved in an exemplary credit card purchase transaction using a wireless communication device 1 and attachment 21 in a system such as that shown in FIG. 6 according to an embodiment of the invention. Although the commercial transaction may begin with several preliminary steps (e.g., showing the customer merchandise, agreeing on a purchase price, etc.), the portion of the transaction involving the communication of information over the communication network 102 effectively begins when a communication link is established between the remote computer 101 and the wireless communication device 1 (block 401). The wireless communication device 1 preferably establishes the communication link upon the receipt of a command or input from the user. However, in alternative embodiments, the remote computer 101 may establish the communication link, for example, by periodically polling the wireless communication device 1 and maintaining the communication link if the wireless communication device 1 indicates that it has information to transmit. In embodiments of the invention, the user may input information indicating where the remote computer 101 may be accessed (e.g., a telephone number associated with a modem attached to the remote computer 101 or a uniform resource locator (URL) that can be converted into a network address through a look-up tables known to components within the communication network 102). In an alternative embodiment, the wireless communication device 1 may resent the user with a graphical user interface with pull-down menus or the like indicating the actions the user may choose to take. In such an embodiment, the user may command the wireless communication device 1 to establish the communication link with the remote computer 101 by selecting a corresponding command from one of the pull-down menus.

The step of establishing a link between the wireless communication device 1 and the remote computer 101 may further involve authenticating the user's identity and/or determining that the user is authorized to access and interact with the remote computer 101. To this end, the wireless communication device 1 may seek additional user input (block 402) and process this input or send the input to the remote computer 101 for processing. For example, in embodiments in which the remote computer 101 is accessible only to registered merchants, the wireless communication device 1 may prompt the user for a registration number or other identifying information (e.g., the name of the user). In other embodiments, the user may be prompted to input information about the product and quantity thereof to be purchased (e.g., a SKU number) and this information may be transmitted to the remote computer 101 for processing so that the user can determine, for example, whether sufficient quantities of the product are in stock. In alternative embodiments of the invention, the user may alternatively use an input device in the attachment 21, such as a barcode reader, to transmit this information to the remote computer 101 in blocks 403 to 405 of the illustrated flowchart.

User input that is received by the processor 301 of the wireless communication device 1 may be processed locally by the processor 301, be transmitted to the remote computer 101 for processing, or both. For example in embodiments of the invention, if the user inputs the quantity of a product to be purchased, the processor 301 of the wireless communication device may process this information to calculate a total purchase price based on a unit price for the product stored in the memory 304 of the device. Similarly, the quantity information may be transmitted to the remote computer 101 to determine whether sufficient quantities of the product are available. The remote computer 101 may return a response to the processor 303 of the wireless communication device 1 indicating either the total available quantity of the product or simply whether there is a sufficient quantity of the product available.

In block 403, the user may be prompted to input information using an input device of the attachment 21. For example, in the credit card purchase transaction, the wireless communication device 1 may display a message on LCD 7 instructing the user to swipe the purchaser's credit card using a magnetic stripe reader, smartcard reader or other input device associated with the attachment 21. Alternatively, the processor 301 of the wireless communication device 1 may use a different output device 306 to prompt the user to use the input device 308 of the attachment 21. For example, the processor 301 may cause a recorded audio message to be played by a speaker. If input is received at the input device (decision block 404), the processor 303 of the attachment may be awoken from a "sleep" state (e.g., a low-power wait mode) and begin to execute instructions to receive the input information. The processor 303 of the attachment 21 may then process this input information (block 405) and the resulting data may be directly transmitted to the antenna 5 of the wireless communication device for transmission to the remote computer 101. In order to transmit the attachment-processed data to the remote computer 101, the attachment 21 may establish a second communication link with the remote computer independent of the communication link previously established between the wireless communication device 1 and the remote computer 101 in step 401. Alternatively, the attachment 21 may transmit the attachment-processed data to the remote computer 101 using the communication link previously established between the remote computer 101 and the wireless communication device 1.

The processing performed by the processor 303 of the attachment 21 may include encrypting the information, dividing the input information into data packets, appending header information to the input information to indicate the identity and/or location of the user, etc. In embodiments of the invention in which the attachment 21 includes multiple input devices, the processor 303 of the attachment 21 may encrypt the input information differently depending on from which input device the input information was received. Furthermore, in embodiments of the invention, the attachment may retrieve from the remote computer 101 one or more encryption keys (public or private) for use in encrypting the input information. The retrieval of encryption keys may be performed once, with each transaction or periodically depending on the type of encryption system used.

The remote computer 101 may receive the attachment-processed data in the course of its communication session with the wireless communication device 1, i.e., the attachment-processed data may be sent to the remote computer 101 over the communication link previously established by the processor 301 of the wireless communication device 1. Alternatively, the attachment 21 may create a separate communication link from that established by the wireless communication device 1. In such embodiments, an application being executed by the wireless communication device 1 may be temporarily suspended by its processor 301 while the antenna 5 is being used by the processor 303 of the attachment 21. In embodiments of the invention, the processor 301 may suspend the application it is executing when it outputs a prompt to the user to enter input to the attachment 21. The processor 301 may resume the application being executed by processor 301 of the wireless communication device 1, for example, when the processor 301 senses that the antenna 5 is unoccupied for a specified period of time. Alternatively, in embodiments of the invention in which one application is suspended to allow the other to be executed, suspension and resumption of the application being executed may be controlled by the remote computer 101 through signals sent to the antenna 5 addressed to the processor 301 of the wireless communication device 1. Such embodiments of the invention may also involve the use of different communication protocols for a communication link established between the wireless communication device 1 and the remote computer 101 and a communication link established between the attachment 21 and the remote computer 101. For example, the communication link between the wireless communication device 1 and the remote computer 101 may be selected to transmit voice and DTMF tone data while the communication link between the attachment 21 and the remote computer 101 may be selected to transmit data (e.g., a WAP communication link). In an alternative embodiment of the invention, resumption of an application being executed by the wireless communication device 1 may be triggered by the receipt of an input from the user through an input device of the wireless communication device 1 (e.g., the alphanumeric keypad 6 or microphone 8).

If the attachment-processed data is an encrypted form of input information corresponding to the prospective purchaser's credit card information, the remote computer 101 may decrypt the attachment-processed data accordingly, determine the identity of the credit card issuer, and access an affiliated computer 103*a* or 103*b* provided by the credit card issuer to determine whether the account number provided is valid. Later during the communication session, the processor 301 of the wireless communication device 1 may transmit to the remote computer 101 the total purchase price, and the remote computer 101 may access the affiliated computer 103*a* or 103*b* provided by the credit card issuer to determine whether the purchaser is authorized by the credit card issuer to make a purchase in that amount and, if so, to instruct the credit card issuer to bill the purchaser in that amount. Once this processing is completed, the remote computer 101 may generate a response for transmission to the processor 301 of the wireless communication device 1. This response may indicate, for example, that the transaction could not be completed because completing the purchase would cause the purchaser to exceed the credit limit associated with the purchaser's credit card, that the transaction was completed satisfactorily, or that additional information is required from the purchaser or user.

If additional input is needed to complete the transaction (decision block 407), the application executed by the processor 301 may return to blocks 402 or 403, depending on the type of input needed. For example, if the remote computer 101 needs the purchaser to input a personal identification number (PIN) known to the credit card issuer to validate the credit card, the processor 301 of the wireless communication device 1 may prompt the user or purchaser to enter this information through an input device 305 (such as, an alphanumeric keypad) associated with the wireless communication device 1 (in block 402). Alternatively, if, for example, a fingerprint is used for validation, the processor 301 may display a message on the LCD 7 of the wireless communication device 1 instructing the user to input a fingerprint, and the user may input a fingerprint to a fingerprint scanner or other input device 308 associated with the attachment 21. Or if the purchaser's signature is required for storage to authenticate and verify the purchaser's assent to a charge being billed to the credit card, the processor 301 of the wireless communication device 1 may prompt the user to enter a signature using an input device, such as a signature reader or optical scanner, associated with the attachment 21 (in block 403).

It should be noted that although block 403, in which the user is prompted to input information through an input device 308 associated with the attachment 21, is shown as being performed after the user inputs information to the processor 301 of the wireless communication device 1, information may be input either through the attachment 21 or the wireless communication device 1 at various points during the transaction and it will be understood that one need not precede the other. Furthermore, the steps of receiving and processing input from either the attachment 21 or the wireless communication device 1 may be repeated several times.

A wireless transaction may also involve additional steps, such as outputting transaction information to the user. This may be accomplished by the remote computer 101 transmitting information to either the wireless communication device 1 or the attachment 21 for output. In an embodiment in which such information is transmit to the attachment 21, the remote computer 101 may send a file representing a transaction receipt to the attachment 21. The attachment 21 may reformat the file for output using one of its output devices, e.g., infrared port 24. The attachment 21 may then transmit the file to a peripheral device, such as a printer so that the receipt may be printed for a user. In an alternative embodiment, the remote computer 101 may transmit receipt-related information to the wireless communication device 1 and the wireless communication device 1 may relay this information to the user using one of its output devices, e.g., the LCD 7 or speaker).

Other transactions may also be performed using the system of the present invention. For example, during a traffic stop, a police officer may swipe a driver's license using a portable communication device 1 and an attachment 21. The driver's license information may be read by a magnetic stripe reader associated with the attachment 21. This input information may be encrypted and otherwise processed by the processor 303 of the attachment 21 and sent to a remote computer 101 provided by the police organization or another state agency (such as, the Department of Motor Vehicles). The remote computer 101 may return information regarding the driver's previous citation history, available court dates, verification of the driver's identity, etc.

While the description above refers to particular embodiments of the present invention, it should be readily apparent to people of ordinary skill in the art that a number of modifications may be made without departing from the spirit thereof. The accompanying claims are intended to cover such modifications as would fall within the true spirit and scope of the invention. The presently disclosed embodiments are, therefore, to be considered in all respects as illustrative and not restrictive, the scope of the invention being indicated by the appended claims rather than the foregoing description. All changes that come within the meaning of and range of equivalency of the claims are intended to be embraced therein.

What is claimed is:

1. An attachment to be utilized with a wireless communication device, comprising:
   a communication interface to receive a transaction request from the wireless communication device via a first localized wireless networking protocol and to transmit the transaction request;
   a processor to receive the transaction request and to issue an initialization request; and
   a first input device to receive the initialization request and to capture data from a card and to transmit the data,
   wherein the processor receives the data from the first input device, encrypts the data to create encrypted data, and transmits the encrypted data to the communication interface, and the communication interface transmits the encrypted data via a second localized wireless networking protocol to a receiving device, the receiving device being a different device from the wireless communication device.

2. The attachment of claim 1, wherein the localized wireless networking protocols is one of a group of a 802.22 (a), a 802.22(b), a 802.22(i), a 802.22(n), and a 802.22(g) protocol.

3. The attachment of claim 1, further including a removable memory to store user specific information.

4. The attachment of claim 1, further including a removable memory to be utilized as additional storage for applications of the wireless communication device.

5. The attachment of claim 1, wherein the input device captures magnetic data from a card.

6. The attachment of claim 1, wherein the input device optically captures optical data from a card and transmits corresponding data to the processor.

7. The attachment of claim 6, wherein the input device is selected from a group consisting of an optical scanner, a MICR scanner, a one-dimensional bar-code scanner, a biometric reader and a two-dimensional bar-code scanner.

8. The attachment of claim 6, wherein the processor performs character recognition on the optical data to create digital data and the processor encrypts the digital data.

9. The attachment of claim 1, wherein the input device is supported by a reader assembly, a side wall of an attachment slot, and at least one alignment post.

10. The attachment of claim 1, wherein the attachment includes a charging port for connection to an external charger, a diode to prevent excessive current or voltage conditions, and a voltage regulator to supply necessary voltages to components of the attachment.

11. The attachment of claim 1, further including a connector to be utilized to physically connect to the wireless communication device and a bracket assembly to allow a rocking motion for the connector during engagement of the wireless communication device and the attachment.

12. The attachment of claim 1, the attachment further including a top housing and a bottom housing, wherein the top housing and the bottom housing each include a plurality of matching one-way referencing tabs to provide additional mechanical engagement support.

13. The attachment of claim 1, further including a printer to print data or messages related to a transaction completed by the attachment.

14. The attachment of claim 1, the attachment further including a display to display messages related to the attachment.

15. A method of operating a wireless attachment, comprising:
   receiving an initialization command from a wireless communication device via a first localized wireless communication protocol and initializing the wireless attachment;
   activating a reader assembly in the wireless attachment;
   capturing, by the reader assembly, data from an object, and transmitting the data to a processor;
   encrypting the data, by the processor, to create encrypted data and transmitting the encrypted data to a communications interface in the attachment; and
   receiving the encrypted data at the communications interface and transmitting the encrypted data to a receiving computing device other than the wireless communication device which submitted the initialization command via a second localized wireless communication protocol.

16. The method of claim 15, wherein the wireless attachment receives a status transmission from a server and enters into a hibernation state to conserve energy.

17. The method of claim 15, wherein capturing data from an object includes capturing optical data from the object and transmitting the corresponding data to the processor.

18. The method of claim 17, further including performing character recognition by the optical data by the processor to generate digital data and having the processor encrypt the digital data to created encrypted transaction data.

19. The method of claim 15, further including storing application data from the wireless communication device in a removable memory of the wireless attachment.

20. The method of claim 19, further including requiring the utilization of a media key to access data stored in the removable memory or the wireless attachment.

21. The method of claim 15, further including storing in an internal memory an encryption key that is utilized to create the encrypted data.

22. A machine-readable medium having recorded thereon instructions, such that when said instructions are executed, said instructions cause a wireless attachment to:
   receive an initialization command from a wireless communication device via a first localized wireless communication protocol and initialize the wireless attachment; activate a reader assembly in the wireless attachment;
   capture, by the reader assembly, data from an object, and transmit the data to a processor;
   encrypt the data, by the processor, to create encrypted data and transmit the encrypted data to a communications interface in the attachment; and
   receive the encrypted data at the communications interface and transmit the encrypted data to a receiving computing device, other than the wireless communication device which submitted the initialization command, via a second localized wireless communication protocol.

23. The machine-readable medium of claim 22, including instructions which when executed cause the wireless attachment to receive a status transmission and place a wireless attachment into a hibernation state.

24. The machine-readable medium of claim 22, wherein the capture of data from the object includes capturing optical data from the object and transmitting the corresponding data to the processor.

25. The machine-readable medium of claim 24, including instructions which when executed, cause the wireless attachment to performing character recognition of the optical data by the processor to generate digital data and to have the processor encrypt the digital data.

26. The machine-readable medium of claim 22, including instructions which when executed cause the wireless attachment to store application data from the wireless communication device in a removable memory of the wireless attachment.

27. The machine-readable medium of claim 22, including instructions which when executed cause the wireless attachment to store in a removable memory an encryption key that is utilized to create the encrypted data.

* * * * *